(12) United States Patent
Willmann

(10) Patent No.: US 10,848,445 B1
(45) Date of Patent: Nov. 24, 2020

(54) GROUP MESSAGING SYSTEMS AND METHODS

(71) Applicant: Council Technologies Inc., Dover, DE (US)

(72) Inventor: Travis Willmann, Richmond, VA (US)

(73) Assignee: Council Technologies Inc., Dover, DE (US)

( * ) Notice: Subject to any disclaimer, the term of this patent is extended or adjusted under 35 U.S.C. 154(b) by 25 days.

(21) Appl. No.: 15/498,336

(22) Filed: Apr. 26, 2017

Related U.S. Application Data

(60) Provisional application No. 62/327,480, filed on Apr. 26, 2016.

(51) Int. Cl.
*H04L 12/58* (2006.01)
*G06Q 10/06* (2012.01)
*G06Q 30/02* (2012.01)

(52) U.S. Cl.
CPC ........... *H04L 51/04* (2013.01); *G06Q 10/063* (2013.01); *G06Q 30/0201* (2013.01); *G06Q 30/0203* (2013.01); *H04L 51/08* (2013.01); *H04L 51/16* (2013.01); *H04L 51/32* (2013.01)

(58) Field of Classification Search
CPC ......... H04L 51/04; H04L 51/16; H04L 51/32; H04L 51/08; G06Q 10/063; G06Q 30/0201; G06Q 30/0203
See application file for complete search history.

(56) References Cited

U.S. PATENT DOCUMENTS

| | | | |
|---|---|---|---|
| 9,733,698 B1 * | 8/2017 | Schmitz | G06Q 50/01 |
| 10,740,705 B2 * | 8/2020 | Joi | G06F 9/451 |
| 2003/0233337 A1 * | 12/2003 | Yanase | G06Q 30/02 |
| 2006/0155513 A1 * | 7/2006 | Mizrahi | G06Q 30/02 702/179 |
| 2008/0010351 A1 * | 1/2008 | Wardhaugh | G06Q 30/02 709/206 |
| 2008/0126488 A1 * | 5/2008 | O'Sullivan | H04L 51/10 709/206 |
| 2009/0282354 A1 * | 11/2009 | Poulson | G06F 17/246 715/769 |
| 2010/0262463 A1 * | 10/2010 | Tryfon | G06O 30/0203 705/7.32 |
| 2011/0184780 A1 * | 7/2011 | Alderson | G06Q 30/0203 705/7.32 |
| 2012/0047000 A1 * | 2/2012 | O'Shea | G06Q 10/063 705/7.42 |

(Continued)

*Primary Examiner* — Ramy M Osman
(74) *Attorney, Agent, or Firm* — Zeller IP Group PLLC; Kyle M. Zeller

(57) ABSTRACT

Methods, systems, and apparatuses, including computer programs encoded on a computer storage media, are provided for facilitating group communications. The described embodiments provide a group chat application allowing a user to send multiple types of messages, including decision messages (or interactive message), to one or more group chat recipients. The decision messages may include a question, a number of answer options, and a time limit for response. Such messages may be displayed in a group chat feed to allow group participants to submit responses by selecting or ranking the answer options. Results may be determined from the submitted responses and displayed to the sender of a decision message.

16 Claims, 15 Drawing Sheets

(56) References Cited

U.S. PATENT DOCUMENTS

| | | | | |
|---|---|---|---|---|
| 2012/0170569 | A1* | 7/2012 | Al-Khudairi | H04L 69/28 370/346 |
| 2012/0246580 | A1* | 9/2012 | Bouverat | G06Q 50/01 715/753 |
| 2012/0323991 | A1* | 12/2012 | Wang | G06Q 30/0203 709/203 |
| 2013/0084958 | A1* | 4/2013 | Davis | G07F 17/32 463/25 |
| 2013/0123583 | A1* | 5/2013 | Hill | G06F 16/284 600/300 |
| 2013/0132221 | A1* | 5/2013 | Bradford | G06Q 30/06 705/26.1 |
| 2013/0179221 | A1* | 7/2013 | Xamonthene | G06Q 30/02 705/7.32 |
| 2014/0108066 | A1* | 4/2014 | Lam | G06Q 50/14 705/5 |
| 2015/0235563 | A1* | 8/2015 | Byrne | G09B 7/06 434/362 |
| 2015/0297981 | A1* | 10/2015 | Kim | G06Q 30/02 463/9 |
| 2016/0005057 | A1* | 1/2016 | Zavala | G06Q 30/0203 705/7.32 |
| 2016/0127292 | A1* | 5/2016 | Birger | H04L 51/04 709/206 |
| 2017/0063745 | A1* | 3/2017 | Banerjee | H04L 51/046 |
| 2017/0139888 | A1* | 5/2017 | Ramlet | G06F 3/0482 |
| 2018/0089706 | A1* | 3/2018 | Li | G06Q 30/0203 |

\* cited by examiner

GROUP MESSAGING SYSTEMS AND METHODS

CROSS-REFERENCE TO RELATED APPLICATIONS

The present application claims benefit of U.S. provisional patent application Ser. No. 62/327,480, titled "Group Messaging Systems and Methods," filed Apr. 26, 2016, which is incorporated by reference herein in its entirety.

BACKGROUND

This specification relates generally to systems, methods and apparatuses for facilitating group communications. More specifically, the specification relates to a group messaging application and platform that provides decision-making functionality.

Group messaging applications are becoming a very popular means of communicating with friends and business colleagues due to their convenience and low cost. Such applications typically include a graphical user interface ("GUI") that displays a list of all participants in a group chat by name or alias, a chronological display of group messages with an associated time stamp and participant identification, and a text entry area for composing messages. Many available applications allow users to participate simultaneously in two or more group chats.

Individuals often use group chat applications to ask and answer questions amongst their personal and professional contacts. Unfortunately, such communications are not interactive and a user who asks a question may go hours or days without receiving an answer from other participants. Moreover, the asker may have to browse through a number of unrelated messages to find and manually aggregate relevant answers to their question.

There are several social networks that allow users to post a poll or survey to which other members of the social network may respond. For example, users of social networking platforms, such as Twitter™ and Facebook™, may poll their followers or fans. Unfortunately, these polling services do not allow for respondents to rank available answer options, as responses are limited to the selection of a single option. Moreover, the public nature of these polling services prevents individuals from polling separate and unique groups of individuals. There is therefore a need in the art for systems, methods and apparatuses that facilitate group decision making via a mobile or web-based group chat application

SUMMARY

In accordance with the foregoing objectives and others, methods, systems and apparatuses, including computer programs encoded on computer storage media, are provided for facilitating group decision-making through a group chat application that allows users to send interactive messages (also referred to herein as "decision messages") to one or more group chat participants. Exemplary group chat applications allow users to create and send decision messages including text (e.g., a question) and a number of answer options. The applications may display such decision messages within a group chat feed to allow each group participant to answer the decision message by ranking the available answer options according to their preference. The application may aggregate such responses and provide detailed results to the sender (and, optionally, the group) to facilitate decision-making.

The application may be adapted to allow group chat participants to easily send and receive multiple types of messages within a single group chat. Exemplary message types include text messages, attachment messages, announcement messages and/or decision messages. And the application may allow users to send messages to, and receive messages from, participants in any number of groups.

In one aspect of the embodiments, a computer-implemented method of determining group preferences via interactive messages is provided. The method may include receiving, by a computer, a request to create an interactive message, any interactive message text, a plurality of interactive message answer options, and/or a plurality of interactive message recipients. Such information may be received from a user via an interactive message creation interface. The method further includes creating, by the computer, an interactive message that includes the received message text and answer options and transmitting the interactive message to each of the recipients. Responses to the interactive message may be received, by the computer, from at least one of the recipients, where each response may include a ranking of the answer options. The method may further include determining a result of the interactive message, including: calculating a total score for each of the answer options based on the rankings of the answer options in the responses; and determining an overall ranking of each answer option based on the total score of each answer option. Finally, the method may include transmitting the results to the user.

In another aspect of the embodiments, a group messaging system for facilitating group decision-making via interactive messages is provided. The system may include a user device associated with a user; a plurality of recipient devices, each recipient device associated with a recipient; and a server in communication with the user device and each of the recipient devices via a network. The server may be adapted to: receive a request to create an interactive message from the user device; receive interactive message text from the user device; receive a plurality of interactive message answer options from the user device; and receive a plurality of interactive message recipients from the user device. The server may be further adapted to create an interactive message including the message text and the answer options; and then transmit the interactive message to each of the recipient devices. In certain embodiments, the server may receive a response to the interactive message from at least one of the recipient devices, where each response includes a ranking of the answer options. The server may be adapted to determine a result of the interactive message, for example, by: calculating a total score for each of the answer options based on the rankings of the answer options in the responses; and determining an overall ranking of each answer option based on the total score of each answer option. Finally, the server may be adapted to transmit the results to the user device and/or any of the recipient devices.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Described are various methods, systems and apparatuses, including computer programs encoded on computer storage media, for facilitating group decision-making through a group chat system. The disclosed embodiments may comprise a server accessible via a client application, which may be installable and executable on user devices such as smartphones, tablets or computers. Additionally or alternatively, the client application may be available as one or more web applications, accessible via a client device having an internet browser.

The described group chat systems and methods disclosed herein substantially reduce the effort required to poll a group of users by, among other things, allowing users to send messages as interactive internet protocol ("IP") packets that one or more group chat recipients can interact with in order to provide feedback to the users. Decision messages may be in the form of an interactive question having a number of user-selectable and/or user-rankable options. Recipients may interact with decision messages to provide a real-time response to the sender. The application may notify a decision message sender of any interactions with the decision message. And the results of such interactions may be aggregated and provided to the original sender and, optionally, one or more of the recipients. Such results may be presented in graphical form, such as via dynamic infographics that may be manipulated to show several variations of the results data. Generally, a user may create and send decision messages to one, some, or all of their contacts.

The group chat application may be adapted to allow group chat participants to easily send and receive multiple types of messages within a single group chat. Exemplary message types include text messages (e.g., SMS messages and instant messages), attachment messages (e.g., messages comprising uploaded and/or linked media files), announcement messages (e.g., messages that may be associated with certain notification properties and user interface behaviors within the application) and/or decision messages. The application may be further adapted to allow users to send/receive such messages to/from participants in any number of groups.

Figure 1:
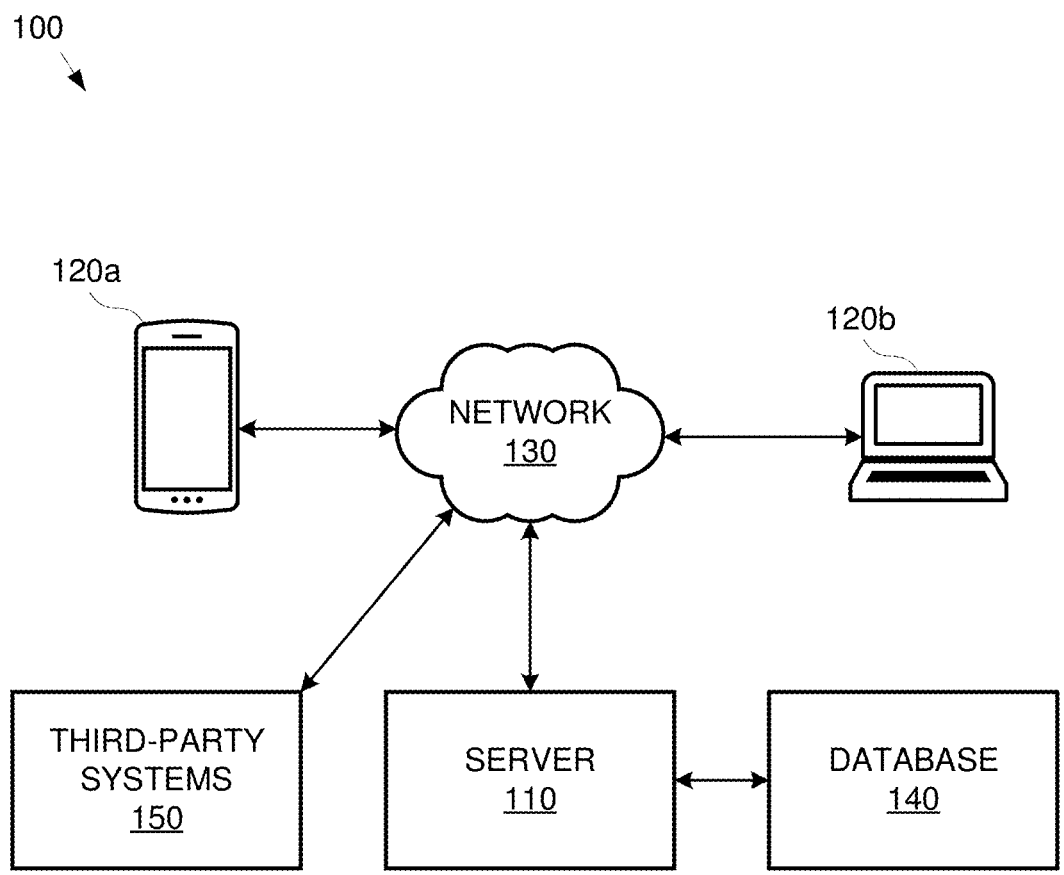
FIG. 1 is a block diagram of an exemplary group chat system for facilitating group decision-making.

Referring to FIG. 1, a block diagram of an exemplary group messaging system for facilitating group decision-making is illustrated. The group messaging system 100 comprises a number of user devices (120a, 120b) operated by various users and accessing a server 110 via a network 130 (e.g., Internet, LAN, cellular, intranet, etc.). As discussed below, a user device may be any device capable of accessing the server 110, such as by executing a client application or other software, such as a web browser or web-browser-like application. Exemplary user devices include, but are not limited to general purpose computers, desktop workstations, laptops, cell phones, smart phones, personal digital assistants, televisions, tablets, and the like.

The server 110 may be adapted to receive, determine, record and/or transmit information for any number of users. Such information may be manually entered or selected by a user via an online, mobile or desktop application. Such information may additionally or alternatively be automatically received from any of such devices. The server 110 may store received or determined information in, for example, a database 140.

In one embodiment, the server 110 may be connected to one or more third-party systems 150 via the network 130. Third-party systems 150 may store information in one or more databases that may be accessed by the server 110. Third-party systems 150 may include, but are not limited to, social networks and/or social media systems (e.g., Facebook™ Twitter™, LinkedIn™, etc.), digital file storage systems (e.g., Google Drive™ Dropbox™, Box™, etc.), communication systems (e.g., Microsoft Skype™, Google Hangouts™, WhatsApp™, etc.), calendaring systems, contact management systems, and others.

In a preferred embodiment, the server may be placed in communication with a third-party telephony system, also known as communication platform as a service (CpaaS). A CpasS may be employed by the system to send SMS messages to users via a cellular network. Exemplary CpaaS providers include, but are not limited to: Twilio™, Plivo™, Nexmo™ and others. Alternatively or additionally, the system may comprise a stand-alone telephony device or server module comprising any hardware or software capable of sending outbound SMS messages.

The server 110 may be capable of retrieving and/or storing information from third-party systems 150, with or without user interaction. Moreover, the server may be capable of transmitting stored information to third-party systems, and may notify users of such communications.

Figure 2:
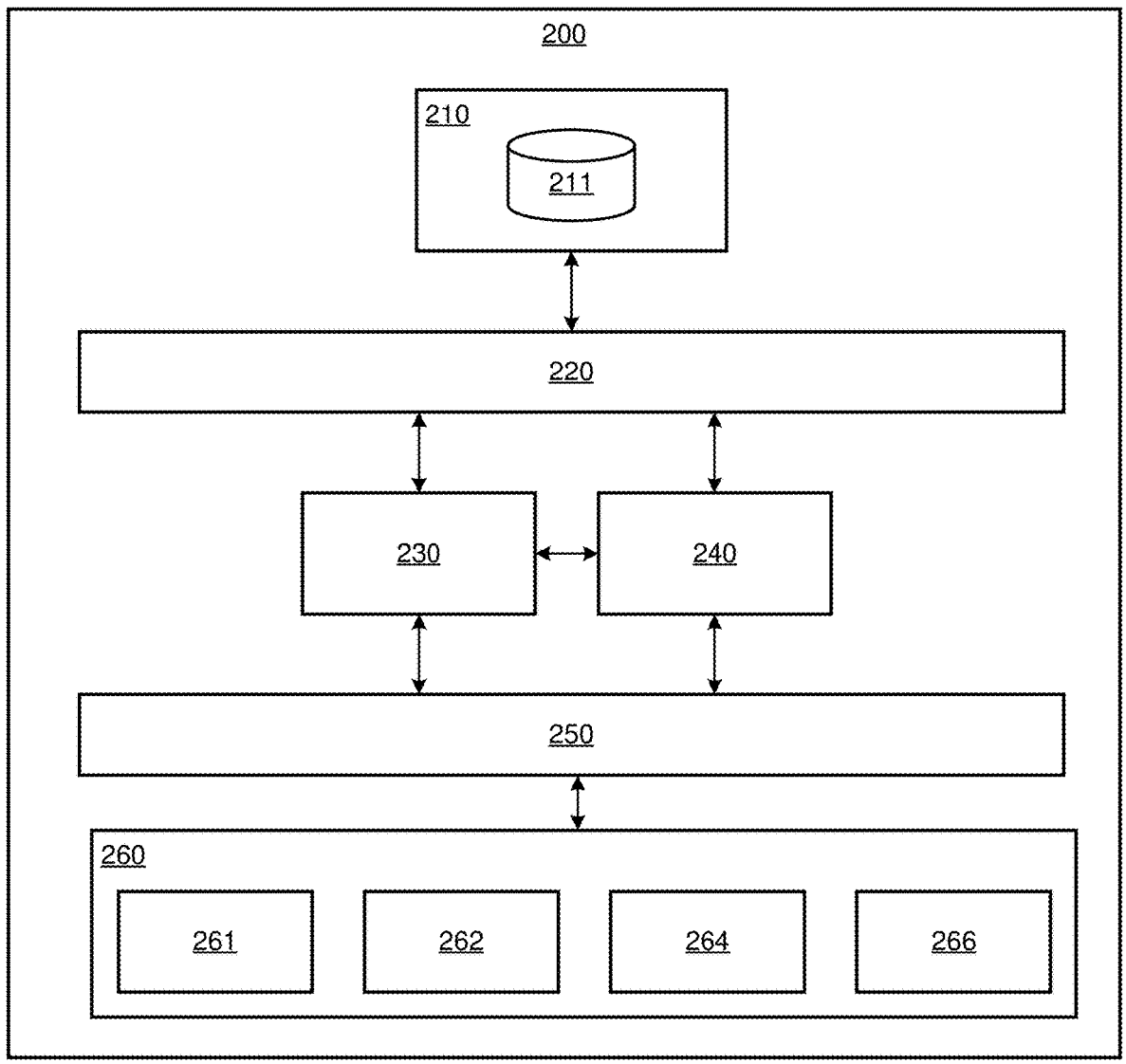
FIG. 2 is a block diagram illustrating an exemplary server for use in the group chat system.

As shown in FIG. 2, the system may be entirely or partially implemented on one or more servers 200 each server comprising hardware 260 such as random access memory ("RAM") 261, any number of processor modules 262, and internal or external memory 264. The server 200 may include a network interface 266 such that it may access the network to send or receive information.

The server 200 may access a central data store or database 210 having at least one database table 211. It will be appreciated that the database 210 may be internal to the server 200 or may be accessed by the server over a network or via a wired or wireless connection. The server may store desired or required information in the database 210 and may access the same to retrieve the information.

In certain embodiments, the database 210 may be in communication with an object relational mapping ("ORM") 220, also known as an object relational model or object-relational database management system. The ORM may be in communication with a Universal Resource Indicator ("URI") 230 mapper and/or a Rest API generator 240.

The URI mapper 230 may map a URI into a pointer to an internal program, view, logic, or presentation of data within the system, based on one or more rules of a matching object specified in a collection of mapping objects. The URI mapper 230 may be in communication with a web server.

The Rest API generator 240 may be in communication with a web server 250 as to send and/or receive data to/from user devices communicating with the server using HTTP and/or HTTPS. The Rest API generator 240 may prepare data stored in the database 210 for delivery to a client device or may prepare data received from a client device for storage in the database 210. The Rest API may be capable of translating between formats including, but not limited to JSON, XML and the like. The Rest API may be capable of automatically generating URIs based upon data structures observed in the ORM 220 for access by client devices.

A web server 250 may be adapted to deliver web pages on request to users using HTTP and/or HTTPS or similar protocols. This allows for delivery of HTML documents and any additional content that may be included by a document, such as images, style sheets and scripts.

Generally, a user or client device may employ a web browser or similar client application to engage in communication with a web server 250. For example, a client application may make a request for a specific resource using HTTP/HTTPS and the web server may respond with the content of that resource or an error message if unable to do so. The resource may be data or a file stored in a database. The web server 250 can receive content from a user, possibly using HTTP/HTTPS.

Figure 3:
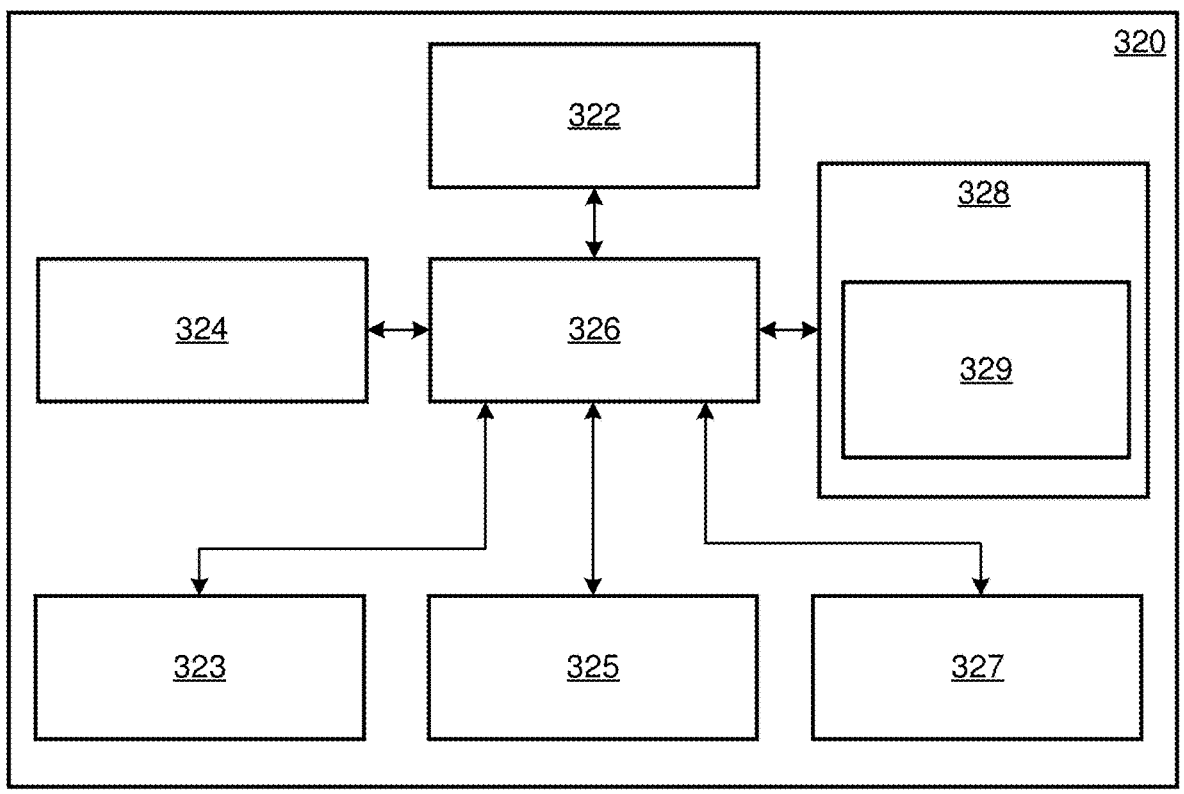
FIG. 3 is a block diagram illustrating an exemplary user device for use in the group chat system.

Referring to FIG. 3, an exemplary user device 320 is illustrated. Exemplary user devices include, but are not limited to, smartphones, tablets, personal digital assistants, general purpose computers, laptops, televisions and the like.

As shown, the user device 320 may comprise one or more wireless and/or wired network interface modules 322 (e.g., Wi-Fi, 3G/4G cellular and/or LTE transceivers), one or more camera modules 323, one or more display modules 324, one or more user input interfaces 325, one or more processor modules 326, one or more SIM/user associated modules 327, and/or one or more memory modules 328. Additional modules may include an input/output device, a location sensor, and/or audio equipment.

Each user device 320 may have one or more client applications 329 stored in its memory module 328 and executable by the processor module 326, where each client application 329 may be adapted to communicate with a group chat application running on a server over, for example, a network. Additionally, or alternatively, the client application 329 may be available as one or more web applications, accessible via the client device 320 having an internet browser. Such configurations may allow users of client applications 329 to input information and/or interact with the group chat application from any location that allows for access to the server (e.g., via wired or wireless network).

As discussed in detail below, exemplary client applications 329 allow for the transmittal and reception of various message types to/from other users (e.g., within one or more groups). To that end, the client application may be adapted to present various user interfaces to users. Such user interfaces may be based on access privileges and/or information sent by the system, and may allow the user to send and receive data. Exemplary client applications may comprise HTML data, images, icons, and/or executable code. The executable code may be composed in JavaScript, ECMAscript, Coffeescript, Python, Ruby or other programming languages suitable for execution within the client application, or translation into a client application executable form.

It will be apparent to one of ordinary skill in the art that, in certain embodiments, any of the functionality of a client may be incorporated into the server, and vice versa. Likewise, any functionality of a client application may be incorporated into a browser-based client, and such embodiments are intended to be fully within the scope of this disclosure. For example, a browser-based client application could be configured for offline work by adding local storage capability, and a native application could be distributed for various native platforms (e.g., Google Android™ or Apple iOS™) via a software layer that executes the browser-based program on the native platform.

In one embodiment, communication between a client application and the server may involve the use of a translation and/or serialization module. A serialization module can convert an object from an in-memory representation to a serialized representation suitable for transmission via HTTP/HTTPS or another transport mechanism. For example, the serialization module may convert data from a native Python, Ruby, or Java in-memory representation into a JSON string for communication over the client-to-server transport protocol.

Similarly, communications of data between a client device and the server may be continuous and automatic, or may be user-triggered. For example, the user may click a button or link, causing the client to send data to the server. Alternately, a client application may automatically send updates to the server periodically without prompting by a user. If a client sends data autonomously, the server may be configured to transmit this data, either automatically or on request, to additional clients and/or third-party systems.

It will be recognized that any other suitable software, hardware or combinations thereof may be used with the exemplary systems and applications disclosed herein. Moreover, such applications may be implemented at any suitable location, such as but not limited to the server, a third-party system, at one or more user devices or at a location not shown.

Embodiments of the currently described group chat application may be presented in the form of a downloadable application installable and executable on a user device, such as a smartphone or tablet. After downloading and opening the application, a user may be presented with a login screen, requiring the user to create an account or sign into an existing account.

In certain embodiments, such account creation and/or login activities may implement a third-party identity service to verify the identity of the user. Any number of third-party identity services may be implemented.

Once a new user signs into the application, they may be asked to enter additional personal information such as a name, email, phone number, etc. Such personal information may be automatically populated from a connected third-party identity service.

Figure 4:
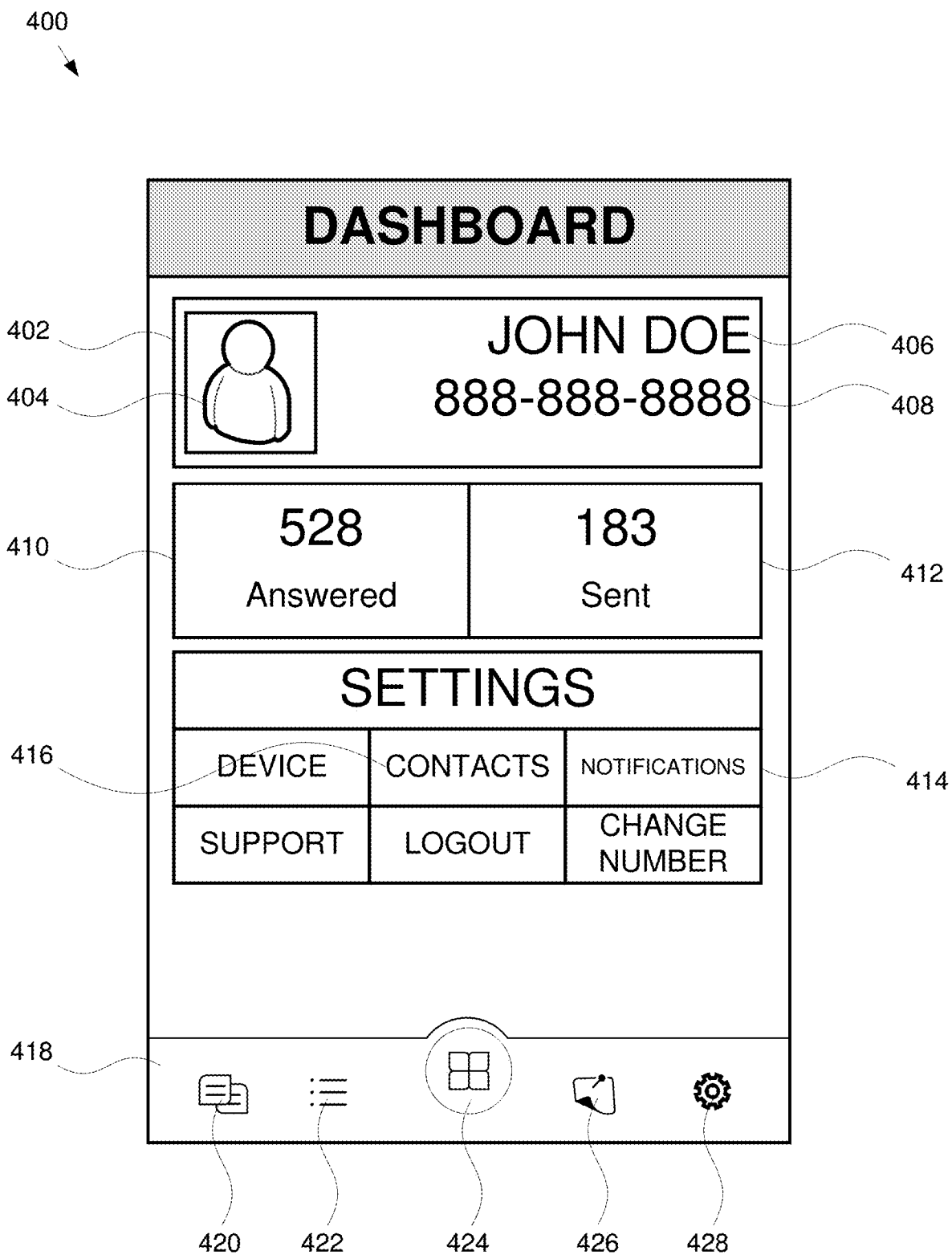
FIG. 4 illustrates an exemplary user dashboard screen of a group chat application.

Referring to FIG. 4, a user dashboard screen 400 of an exemplary group chat application is illustrated. As shown, the dashboard screen 400 displays user information and allows the user to access and/or modify application settings. For example, the dashboard screen 400 may provide a placard 402 comprising an image 404, a name 406 and a phone number 408 associated with the user's account. Various user statistics may also be shown via the dashboard screen 400, such as a number of decision messages answered 410 and a number of decision messages sent 412.

The dashboard screen 400 may further display a number of links to various settings options. For example, a device button may link to a settings screen, where the user may: view application storage and memory usage, adjust permissions, toggle attachment displaying when their device is not connected to Wi-Fi, toggle background refreshing of the application, monitor cellular data usage, force SMS protocol for all communications when not connected to Wi-Fi, and/or toggle read receipts. A notifications button 414 may link to a notification settings screen, where a user can turn on/off notifications for various events, such as upon receipt of: new messages, new decision messages, new results, and/or new "favorites" of their messages. The dashboard may further include a link to a contacts screen 416, which, as described below, shows a list of contacts.

In certain embodiments, a navigation menu 418 may be displayed, for example, at the bottom of the dashboard screen 400. As shown, the navigation menu 418 may comprise links to various application screens, such as links to a group chat list screen 420, a decision messages list screen 422, a new message creation screen 424, an announcements list screen 426 and/or a link to the user dashboard screen 428. As discussed in detail below, the user may view recent messages sent within each of their groups by selecting the group chat list screen link 420; the user may view sent, pending, and answered decision messages via a decision messages list screen link 422; the user may create and send messages by selecting the new message creation screen link 424; and the user may view new announcements and pinned announcements via an announcements list screen link 426 of the navigation bar 418.

Figure 5:
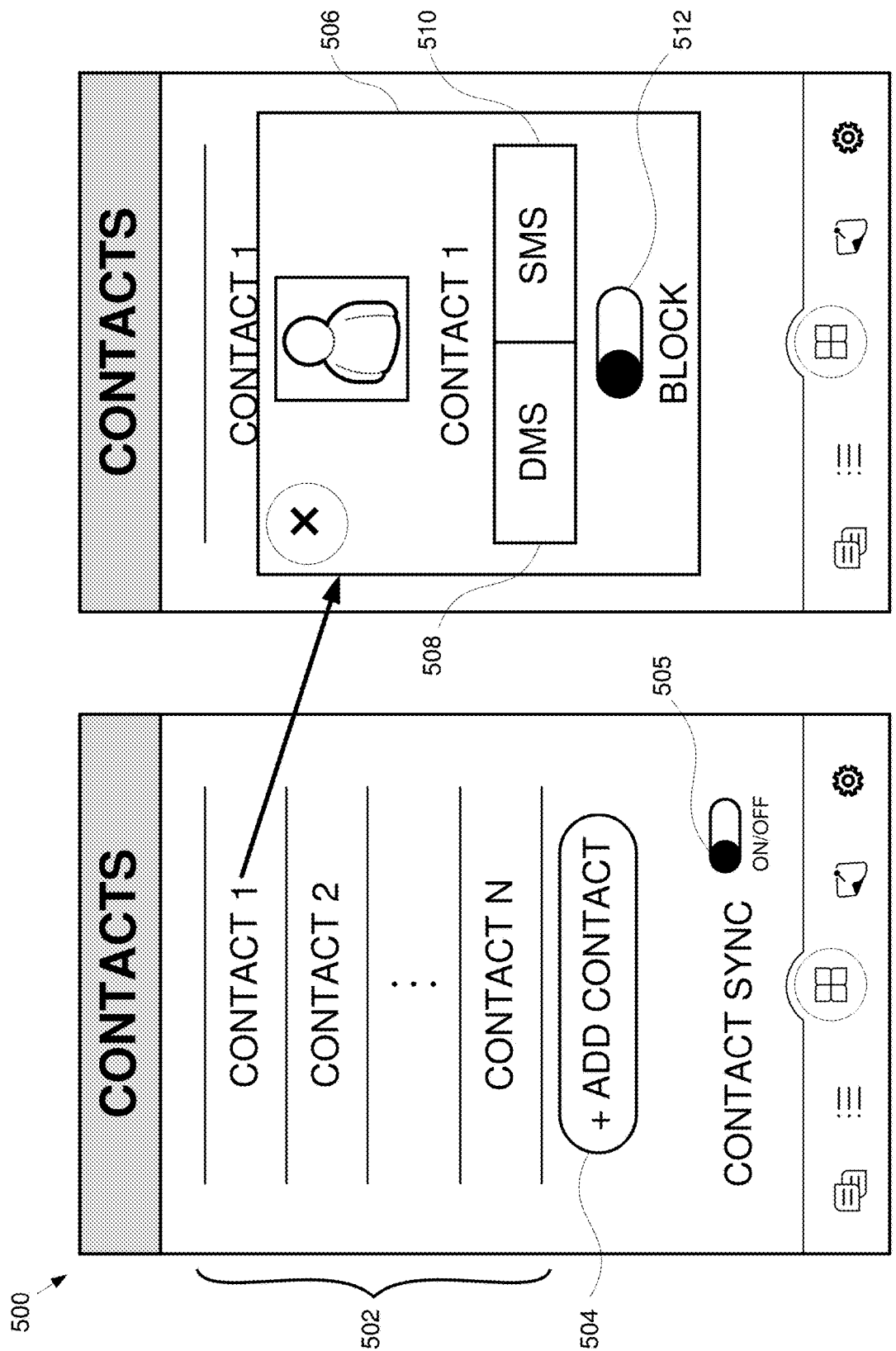
FIG. 5 illustrates an exemplary contacts screen of the group chat application.

Referring to FIG. 5, a contacts screen 500 is illustrated for an exemplary group chat application. The contacts screen 500 may be accessed by, for example, selecting an option displayed on the user dashboard screen (see FIG. 4 at 416).

As shown, the contacts screen 500 may show a list of contacts 502 associated with a user's account. This screen may include an option to add one or more contacts to the application for messaging by selecting an 'add contact' button 504. Such contacts may be added manually or may be automatically created by the application via connection to the user's mobile device contact book or a third-party systems (e.g., upon activating a contact sync option 505). In one exemplary embodiment, a user may search for contacts that are already using the application by entering a phone number and/or email address of the contact. If a user wishes to add a contact who is not already using the application, the user may send that contact an invite via email or text message.

In certain embodiments, a contact detail modal, window or screen 506 may be displayed upon selection of one of the contacts in the contact list. The contact details screen 506 may display contact information for a selected contact, such as but not limited the contact's: name, image, phone number, username and/or other information. The contact details screen may also display a number of options to allow a user to interact with a selected contact, such as an option to send a decision message 508 or text message 510 directly to the contact and/or an option to block the contact 512.

In certain embodiments, the application may allow a user to create a group chat by selecting multiple contacts in the list of contacts 502. The user may send a single message to all of the selected contacts to start a group chat, as discussed in detail below.

Figure 6:
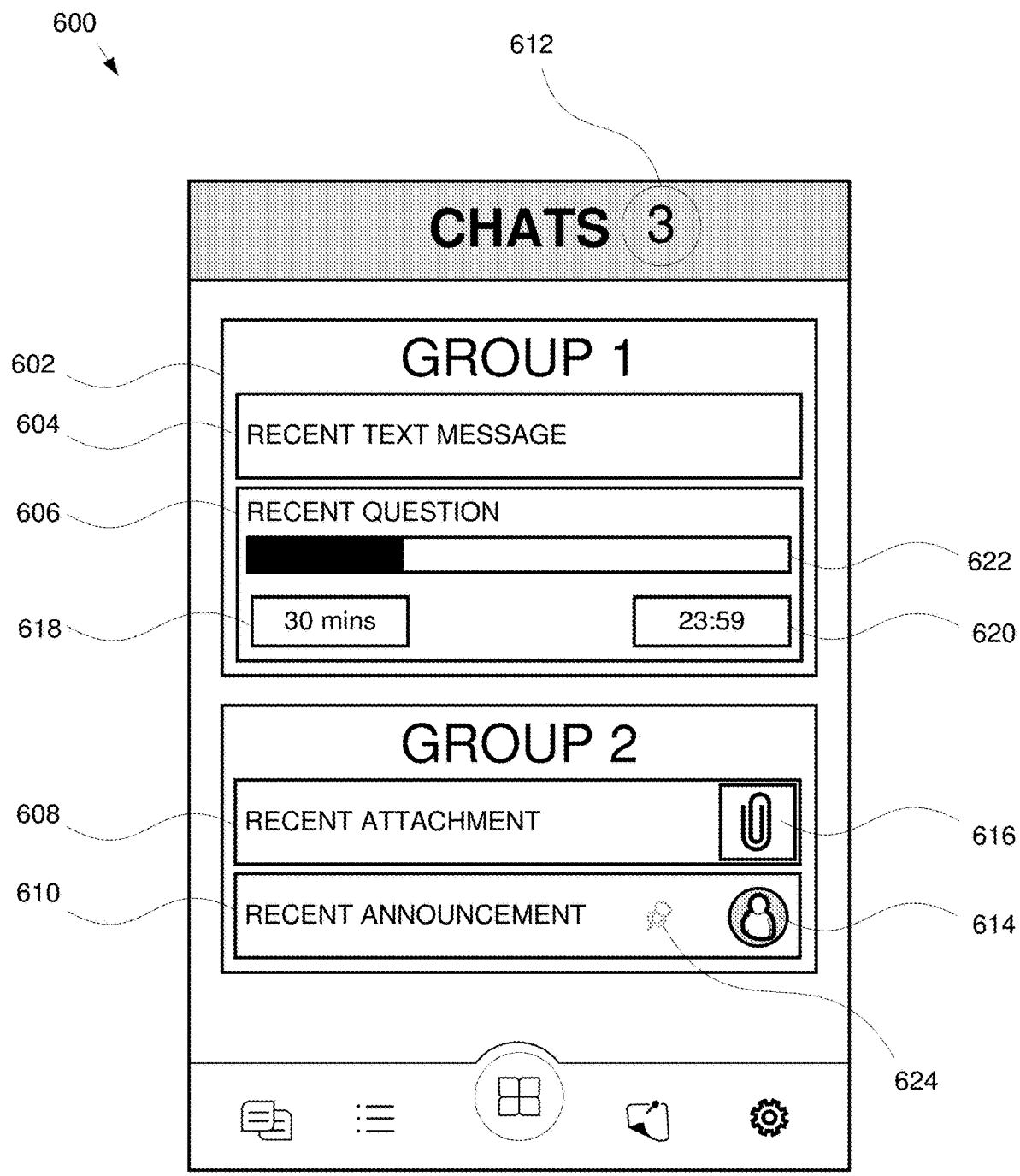
FIG. 6 illustrates an exemplary group chat list screen of the group chat application.

Referring to FIG. 6, a group chat list screen 600 is illustrated for an exemplary group chat application. As shown, the group chat list screen 600 displays a list of groups 602 to which the user belongs or is otherwise associated. This screen may display message information relating to a number of recent messages (e.g., text message 604, decision message 606, attachment messages 608 and/or announcement messages 610) sent to each of the listed the groups 602. The group chat list screen 600 may also show the number of total unread messages 612.

As shown, the group chat list screen 600 may display message information for each message, such as but not limited to: sender information (e.g., name, phone number, username, image 614, etc.); message content (e.g., text and/or hyperlinks); attachment information 616 (e.g., thumbnails or previews of any media files); and a date/time the message was transmitted to a group. For decision messages 606, message information may further include: any or all answer options associated with the decision message, the status of any responses, the total amount of time provided to respond 618, the amount of time remaining to respond 620, and/or a progress bar 622 showing elapsed time. For attachment messages 608, message information may further include metadata information associated with the attachment (e.g., file type, file size, file extension, appropriate application for interacting with the attachment). And for announcement messages 610, message information may further include pinning information, such as an option 624 to pin the announcement to the user's corkboard (discussed below).

Figure 7:
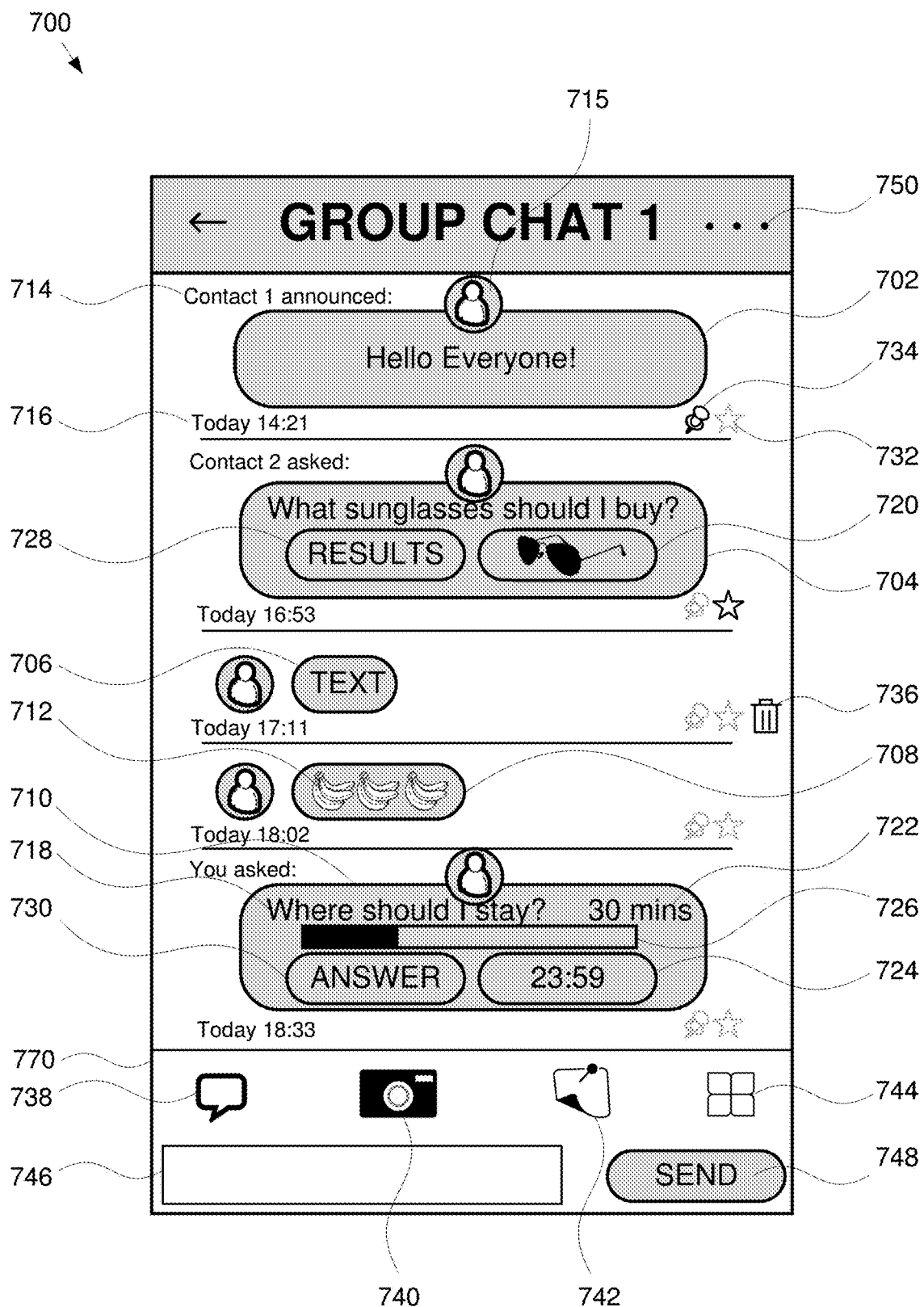
FIG. 7 illustrates an exemplary group chat feed screen of the group chat application.

Referring to FIG. 7, a chat feed screen 700 of an exemplary group chat application is illustrated. In certain embodiments, this screen may be accessed by selecting any group and/or message displayed on the group chat list screen 600 of FIG. 6. For example, selecting recent message 604 associated with Group 1 may cause a chat feed screen 700 to be displayed.

The chat feed screen 700 displays each of the messages sent to the group (e.g., in the order they were sent). This screen may display one or more types of messages within a single feed. For example, five messages are shown in the illustrated embodiment: an announcement message 702; a "completed" decision message 704 (i.e., where all participants have provided responses and/or the time limit to respond has expired); a text message 706; an attachment message 708; and an "in-progress" decision message 710 (i.e., where all participants have not provided responses and the time limit has not expired).

Each of the group messages may be displayed to the group participants along with message information. In one embodiment, all displayed messages (regardless of type) may include message content 712; sender information (e.g., the sender's name 714 and/or profile image 715); and/or a timestamp 716 indicating when the message was sent.

Additional or alternative message information may be displayed depending on the type of message. For example, a decision message may comprise message text 718, one or more thumbnails or previews of media files 720, the total amount of time provided to respond 722, the amount of time remaining to respond 724, a progress bar showing elapsed time 726, a link to view aggregated response results 728 (for completed decision messages) and/or a link to answer the decision message 730.

In certain embodiments, the group messages may be displayed in the feed with one or more options. For example, the system may allow group members to favorite messages by clicking a star icon 732 next to a message. As another example, any group member may pin an announcement to their cork board (discussed below) by selecting a push pin icon 734 next to the announcement 702. As yet another example, the sender of a message may delete the message after sending by selecting, for example, a trash can icon 736 next to the message.

The group chat feed screen 700 allows users to create multiple types of messages and send the same to the group. As shown, this screen may display a message creation menu 770 having a number of message creation options, including a text message creation option 738, an attachment message creation option 740, an announcement message creation option 742 and a decision message creation option 744. The screen may comprise an interactive text entry area 746 to allow a user to enter text content of messages (e.g., via a touchscreen or physical keyboard) and view the same in the text entry area 746.

First, a user may select the text message option to create a text message. A user may enter text message content into the text entry 746 area and, once the user has entered their desired text, they may send the message to the group by pressing a send button 748.

Second, a user may select the attachment message option 740 to create an attachment message. Upon selecting this option, an interactive media selector modal or screen may be displayed. In one embodiment, the media selector screen may display any media files (e.g., images, videos, audio files, GIFs, documents, etc.) that are stored in local memory of the user device (e.g., within a specific folder). The user may then select one or more of the files to upload the same to the group chat (i.e., via the server). In one embodiment, the user may also enter text content via the text entry area 746 to display such text with the attachment message in the group chat feed.

In certain embodiments, the media selector screen may allow the user to employ their device's camera and/or microphone to record and upload a media file. In this embodiment, the media file may be uploaded to the server and displayed to group participants via the chat feed screen.

Additionally or alternatively, the media selector screen may include media files that are stored remotely on the server or on third-party systems (e.g., YouTube™, Facebook™ etc.) In such embodiments, a search function may be provided to allow users to search for media files using keywords or the like. Upon selection of a media file, a link to the file may be displayed via the group chat feed along with any available information (e.g., description, summary, hyperlink, preview image, copyright information, source information, etc.). Such information may also be obtained through metadata associated with the link. For example, a GET request for an image using the Facebook Graph™ API may be utilized by the application to retrieve the names of people tagged in the image. Other examples may involve deriving metadata information from a meta tag of the linked website or other metadata associated with the website.

It will be appreciated that, no matter the message type, the application may automatically recognize any hyperlinks sent to the group and may automatically present a preview of the linked content in the group chat feed. Similarly, the group chat feed may show a preview of any media uploaded by the user. In all cases, any group member may view the content by selecting it in the group chat feed.

Still referring to FIG. 7, a user may select the announcement message creation option 742 to create and send an announcement message. Announcement messages are similar to attachment messages, as they may comprise text and/or media file attachments. Accordingly, selection of the announcement message creation option 742 may cause the media selector screen to be displayed in addition to the interactive text entry area 746.

Generally, announcement messages may be used to indicate that a message is important or unique, and such messages may be displayed with a different background (e.g., shape and/or color) and/or a different font (e.g., larger size, bold, underlined, etc.) than other types of messages. Moreover, as discussed in detail below, announcement messages may be automatically added to the group's cork board and the user's announcements list.

Finally, a user may select the decision message creation option 744 to create and send a decision message to the group. Upon selecting the decision message creation option 744, a decision message creation screen or modal may be displayed to the user.

Figure 8:
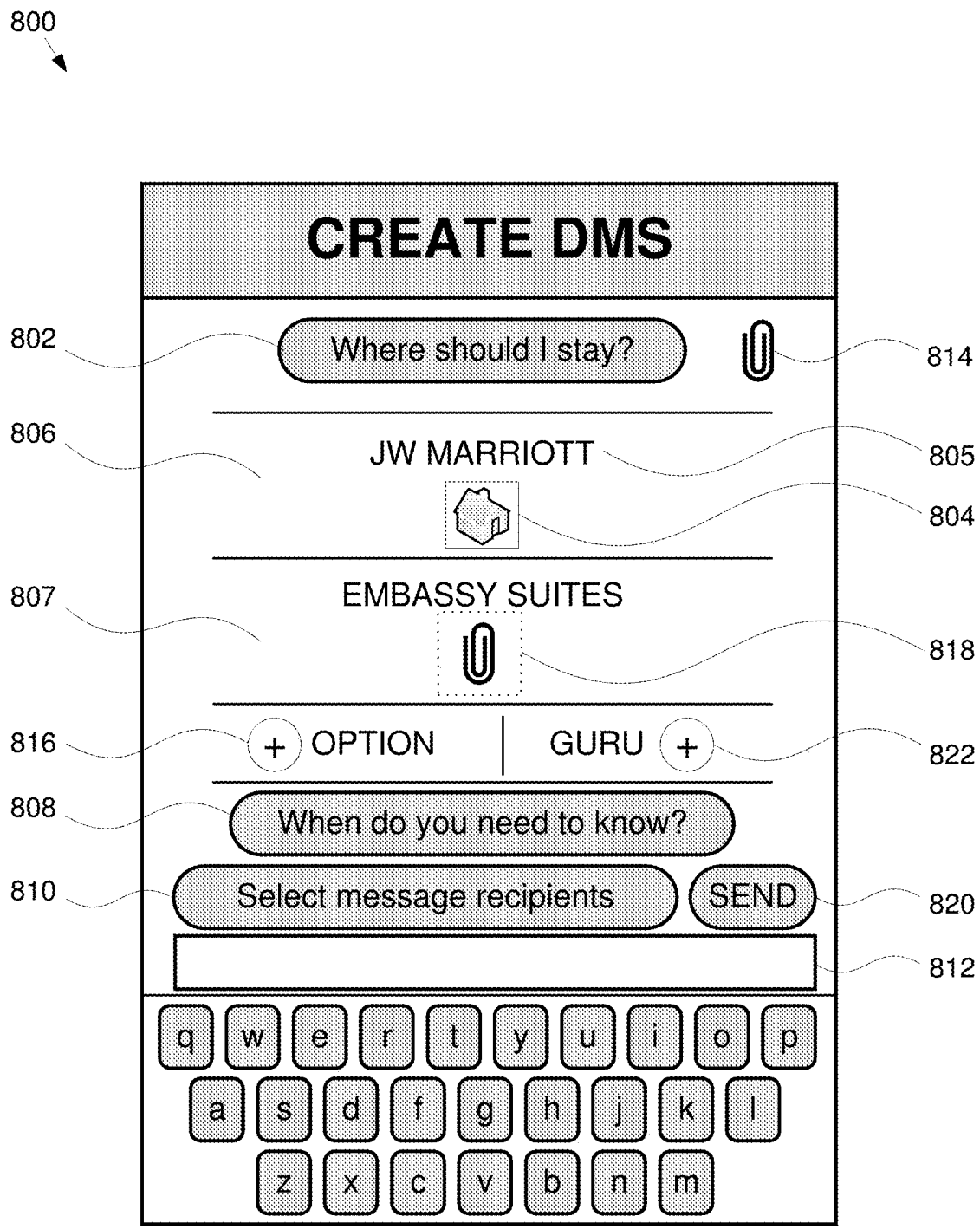
FIG. 8 illustrates an exemplary decision message creation screen of the group chat application.

Referring to FIG. 8, a decision message creation screen 800 of an exemplary group chat application is illustrated. Generally, decision messages allow the sender to ask a question to members of a group and receive responses to the same all within the group chat application. Such messages may include a number of user-created answer options that may be displayed to decision message recipients. And recipients may respond to a decision message by selecting and/or ranking answers.

As shown, the decision message creation screen 800 may comprise a number of user-fillable fields, including but not limited to: a message text field 802, an attachment field 804, an answer options field 806, a time limit field 808, and a recipient field 810. The screen may further comprise a text entry area 812 to allow a user to enter information for any of the form fields (e.g., via a touchscreen or physical keyboard).

A user may enter desired text content of the decision message into the text entry area 812. A decision message may include any amount and/or type of text, but such text is often entered in the form of a question or request to which the decision message sender would like an answer. The message text may be stored by the system and associated with the decision message.

The user may optionally specify an attachment to be included with a decision message. As shown, an attachment option 814 may be selected by a user to open an interactive media selector modal or screen. As discussed above, the media selector screen may display media files that are stored in local memory of the user's device, the server and/or remote third-party systems. The media selector screen may also provide a search function to allow the user to search for media files using keywords or the like. Upon locating a desired media file, the user may select it and the system may associate the media file with the decision message.

It will be appreciated that, in certain embodiments, the media selector screen may allow the user to employ their device's camera and/or microphone to record a media file. Once the media file is recorded and saved to a local drive, the file may be upload to the server, where it is then associated with the decision message.

The decision message creation screen allows the user to create answer options (806, 807) to be included with the decision message. Generally, answer options may comprise text (805, 817), one or more hyperlinks, and/or one or more media files 804 (e.g., images, videos, gifs, audio, and/or documents) stored locally or in cloud storage or captured via camera or microphone.

The user may create a new answer option by, for example, selecting a "add new option" button 816. Upon adding a new answer option, the user may be presented with a text entry field 817. This field may be filled by entering any amount and/or type of text (e.g., a description or summary of the answer option). The user may also be presented with an attachment option 818 that, when selected, causes the media selector modal or screen to be displayed. Using the media selector screen, the user may select any number of media files to be included with the answer option of the decision message. Once the user has added answer option text and, optionally, media files, the answer option will be saved by the system and associated with the decision message.

Although a decision message may comprise a single answer option, preferred embodiments may require at least two answer options. It will be appreciated that any number of answer options may be included with a decision message. Moreover, an answer option may be a custom answer that may be provided by the recipient (i.e., "other").

As shown, a response time limit entry field 808 may be displayed to allow a user to add an optional time limit or deadline to a decision message. In certain embodiments, the user may select a time limit from a list of predetermined time limits (e.g., 5 minutes, 30 minutes, 1 hour, 1 day, etc.) or may specify a custom time limit (e.g., using the interactive text entry area). If predetermined time limits are presented, such times may be manually coded into the system and/or automatically determined by the system (as discussed below).

Generally, the addition of a time limit to a decision message will prevent responses from being submitted after the time limit expires. In other words, responses may only be submitted to decision messages before the time limit expires. This feature may act to create a sense of urgency in recipients of decision messages, thereby resulting in reception of answers in a timely fashion.

Finally, a recipient's field 810 may be displayed to allow a user to specify any number of recipients of the decision message. In one embodiment, a user may select a chat group from a list of chat groups to which they are associated. In this case, the decision message will be displayed to all members of the selected group via the group's chat feed screen.

In another embodiment, a user may select one or more contacts (e.g., from a list of contacts) to whom they would like to send the decision message. The user may create a new group that includes all of the selected contacts, and the decision message may be displayed on the chat feed screen of the newly created group. Alternatively, if the user wishes to collect responses discreetly, the user may opt to send the decision message to each of the contacts individually. In this case, the application may create multiple "groups," where each group includes only the user and one of the selected contacts, and the decision message may be displayed in the chat feed screen of each group.

Once the user has finished entering information for the decision message, they may be presented with a preview screen. The user may also send the decision message to the group at their convenience by, for example, selecting a send button 820.

Figure 9:
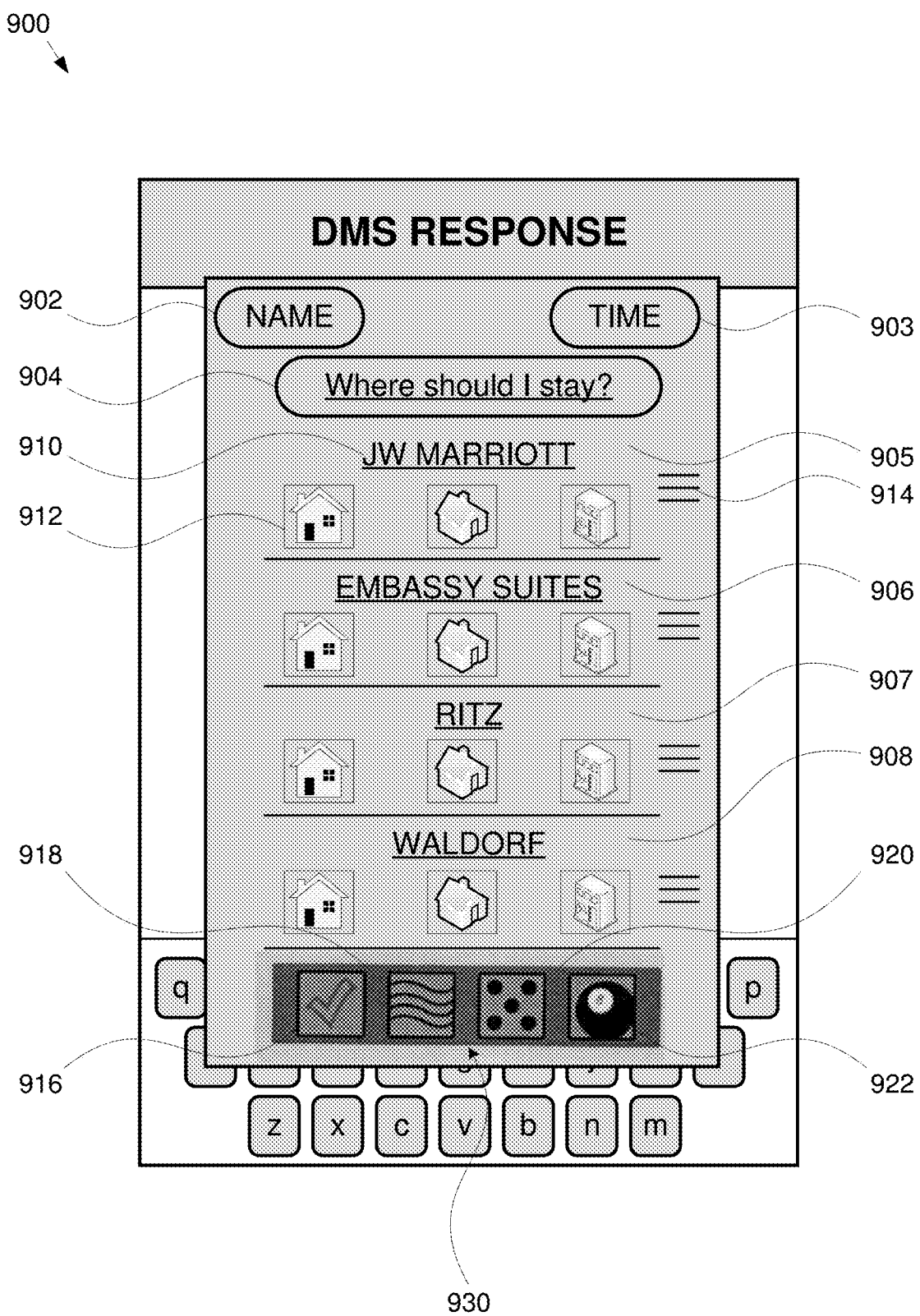
FIG. 9 illustrates an exemplary decision message response screen of the group chat application.

Referring to FIG. 9, a decision message response screen 900 of an exemplary group chat application is illustrated. In one embodiment, this screen may display the details of a decision message opened by a recipient, including a name of the sender 902, the message text 904, any answer options provided (905, 906, 907, 908), a countdown timer 903 (e.g., counting down to a specified deadline), and one or more response options 930. The decision message response screen 900 may be accessed by message recipients by, for example, selecting an in-progress decision message displayed in a group chat feed screen (see FIG. 7 at 718).

As shown, each of the answer options (905, 906, 907, 908) may be displayed with associated text 910, hyperlinks, and/or any media content 912 included by the sender of the decision message. In certain embodiments, recipients of the decision message may play audio or video files and/or enlarge images associated with each of the answer options. Recipients may also select any included hyperlinks to open a linked web page in the application or in other applications (e.g., an internet browser).

Recipients of the decision message may be presented with a number of options 930 to respond to the message. In one embodiment, a recipient may simply select the answer option (905, 906, 907, 908) that they wish to transmit. In this case, the system may receive responses and then determine a score for each of the available answer options by counting the number of responses in which each option was selected. Upon calculating the scores, an aggregate ranking of the answer options may be determined, based on the individual scores. And decision message results may be transmitted to the decision message sender (and/or respondents), wherein the results may comprise information relating to the respondents, answer options, scores, and/or aggregate rankings (see description of FIG. 10, below).

In another embodiment, recipients may tap/hold and slide the answer options into an order of preference by using a slider handle 914 provided for each answer option. For example, the most preferred choice 905 may be placed at the top of the list of answer options and the least preferred choice 908 may be moved to the bottom. The recipients may be able to manipulate one, some, or all of the answer options in any order they wish.

Once the answers are properly ordered, the recipient may select a submit button 916 to transmit their answer choices.

When recipients are allowed to provide rankings of answer options, the application may employ a Borda count or similar method to collect, weigh and score user choices. In one embodiment, the system may assign points to each answer option, based on ranking, where the highest ranked answer option may be assigned the most points and the lowest ranked option may be assigned the fewest points. As an example, the system may assign the following points to answers:

First option=n points
Second option=n−1 points
Third option=n−2 points
Fourth option=n−3 points
Fifth option=n−4 points
Sixth option=n−5 points
Nth option=n−n=0 points where n equals the number of answer options for the given decision message.

Additionally or alternatively, the number of points may be multiplied by the number of recipients of the decision message. As an example, a decision message with 5 answer options sent to 10 recipients will have the following points distribution:

First option: 5*10=50
Second option: (5−1)*10=40
Third option: (5−2)*10=30
Fourth option: (5−3)*10=20
Fifth option: (5−4)*10=10

According to the above formula, if each of the 10 recipients submits a response to the decision message, then the maximum number of available points is 150.

No matter what weighting algorithm is employed, the server may receive decision message responses from various respondents and calculate a weighted score for each of the answer options. The system may then determine an aggregate ranking of each of the answer options, based on the scores. And decision message results may be transmitted to the decision message sender (and/or respondents), wherein the results may comprise information relating to the respondents, answer options, scores, and/or aggregate rankings (see description of FIG. 10, below).

In one embodiment, the system may employ various tie-breaking rules to determine a "winning" answer option and/or an appropriate aggregate ranking of answer options for a decision message in the event of a tie (i.e., when two or more answer options are determined to have received the same score or total number of points). Upon determining that two or more answer options have the same score, the system may first employ a primary ranking criteria. For example, answer options may be ranked according to the number of first place votes received (i.e., options with a higher number of first place votes will be ranked higher than those with a lower number of first place votes).

If multiple answer options are still tied after the primary ranking criteria is employed (i.e., they received the same number of first place votes), the system may employ a secondary ranking criteria. For example, the system may rank the options according to the number of last place votes received (i.e., options with a lower number of last place votes will be ranked higher than those with a higher number of last place votes). Additionally or alternatively, the system may rank the options according to the number of second place votes received (i.e., options with a higher number of second place votes will be ranked higher than those with a lower number of second place votes).

In the event that multiple answer options are still tied after applying the above-described primary and secondary ranking criteria, then the system may display a message or notification explaining the situation. The system may also display an option to allow the decision message sender to edit the message and/or resend it.

In one embodiment, a recipient who does not wish to rank the answer choices may simply select a "go with the flow" (GWTF) option 918. The GWTF option 918 may allow a user to add their vote to the highest-ranked option after either (1) the time limit expires or (2) all non-GWTF responses have been received from the other recipients of the decision message. Essentially, the GWTF option 918 provides a recipient with the option to conform to the rest of the group and feel as though they contributed to answering the decision message.

As an example, if five respondents in a six-user group provide feedback and three of those respondents selected answer option A as their first choice, then option A will be shown to have three first-place votes. But if the sixth member of the group selects the GWTF button 918 instead of not choosing at all, then option A will have four first-place votes, or over 50% of the group. Accordingly, respondents who choose the GWTF option 918 simply choose to support the group's decision even if the overall results would have been the same.

Alternatively, the GWTF option may simply indicate that a user wishes to abstain from selecting or ranking answer choices. In this case, the system may consider the abstaining user as a respondent, without adding points to any of the answer choices. Accordingly, if a decision message recipient selects the GWTF option, and all other recipients have provided responses, the messages may be closed.

As an example, if five users in a six-user group provide substantive feedback to the decision message (i.e., via any means other than GWTF), and the sixth user selects the GWTF option, the application will count all six users as respondents (i.e., where the sixth user is an abstaining respondent). The application will then close the decision message to calculate the results. If five users selected option A at first place, then option A will show five first place votes. The input of the sixth user (GWTF) will not affect the overall final tally.

In yet another embodiment, a user may indicate that they'd like to submit randomly ordered answers (e.g., by selecting a "roll the dice" option 920). Upon selection of this option, the application will submit a response comprising a random ranking of available answer options and such response will be included in any results.

Finally, the user may select a "guru" option 922 to have the system assist or determine the appropriate ranking of answer options based on information the system has learned about the respondent, the sender and/or the answer options. The guru feature is described in detail below.

Figure 10:
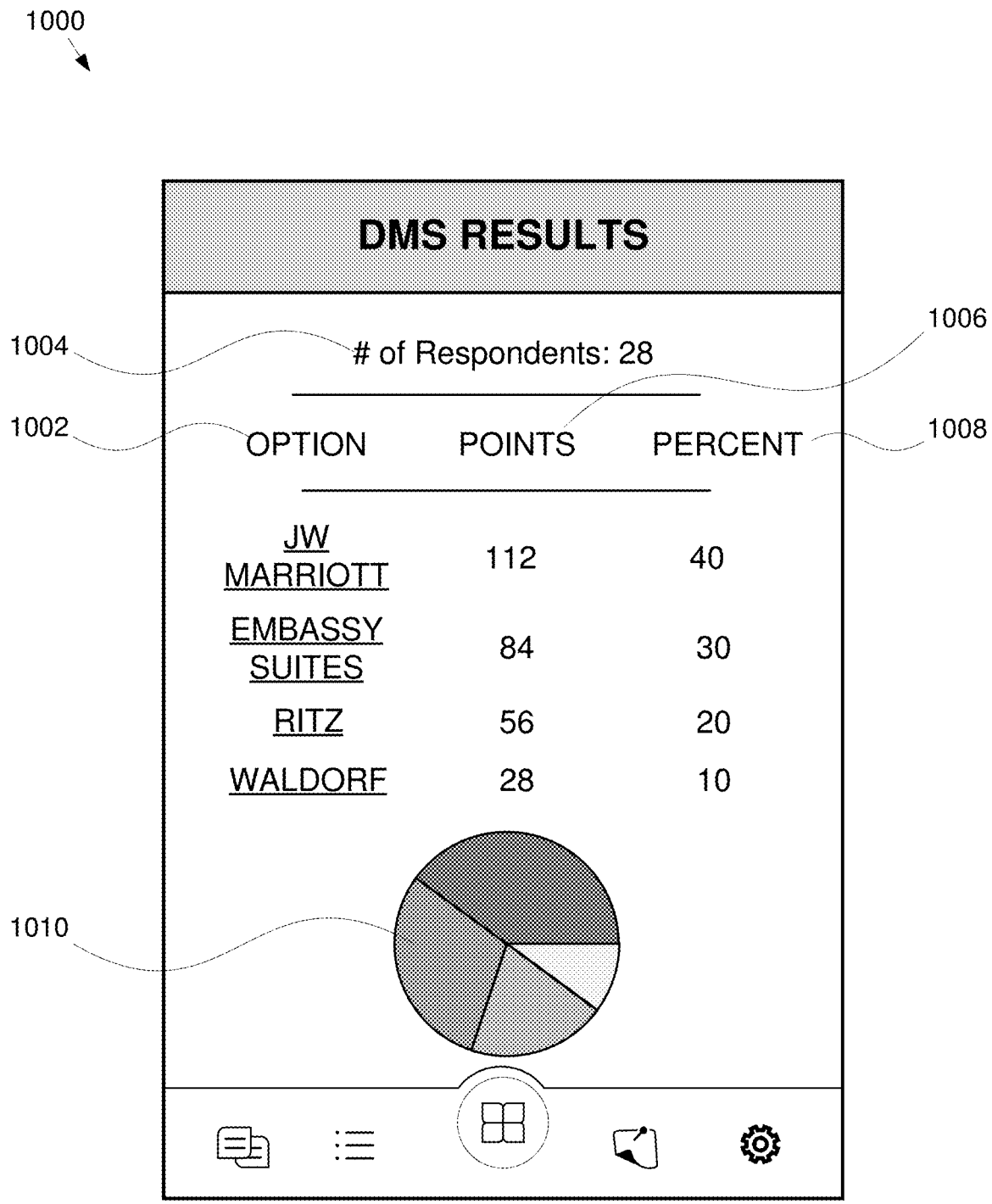
FIG. 10 illustrates an exemplary decision message results screen of the group chat application.

Referring to FIG. 10, a decision message results screen 1000 of an exemplary group chat application is shown. When the time limit for a decision message is reached, or when all recipients of the decision message have submitted responses, results may be automatically calculated and delivered to the sender.

In one embodiment, the application may display the decision message results to some or all of the recipients (e.g., via a group chat feed). Optionally, each user who is allowed to access the results may be notified that the results are ready to be viewed. In certain embodiments, the results may be viewed in real time, before the deadline has expired and/or all responses are collected.

As shown, decision message results may be presented in a number of different formats. For example, the results may include a list of the answer options 1002 ordered by preference and the number of respondents 1004. The results may be shown with additional metrics, such as the total points 1006 and/or percentage of available points 1008 received by each answer option 1002. A visual aid 1010 may also be displayed in this screen (e.g., a pie chart, bar graph, etc.), showing the proportion of votes each answer option 1002 has received.

The displayed results may be manipulable by users to allow for various metrics to be viewed. For example, users may swipe from one view (e.g., a ranked list of answer options) to another view (e.g., a pie chart). Moreover the results may be displayed with or without information about specific answer choices of individual respondent's.

Figure 11:
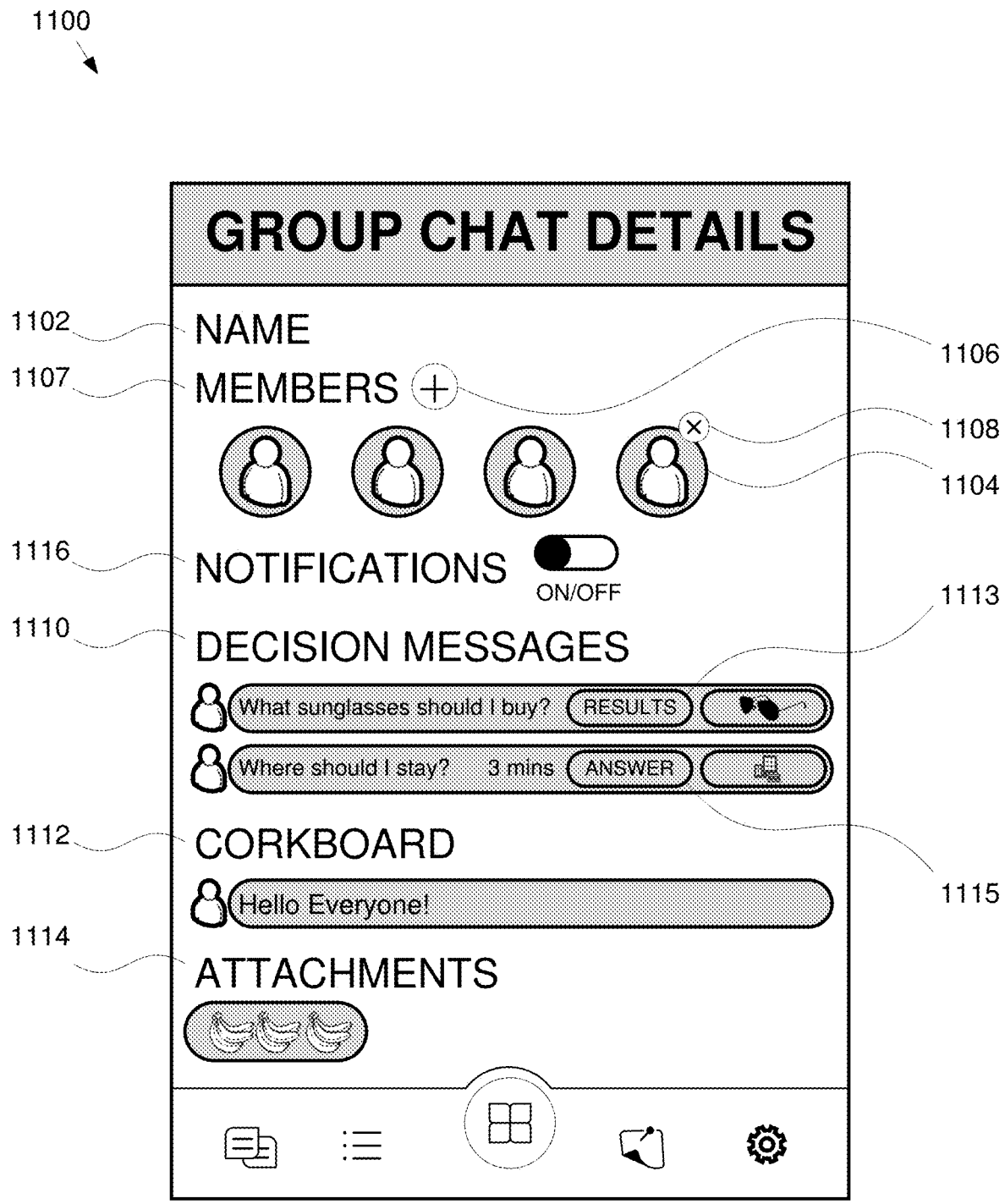
FIG. 11 illustrates an exemplary group chat details screen of the group chat application.

Referring to FIG. 11, a group chat details screen 1100 of an exemplary group chat application is shown. This screen may be accessed, for example, via a group details button of the group chat feed (see FIG. 7 at 750).

The group chat details screen 1100 displays information relating to a group chat, including a group name 1102, an option to receive notifications 1116, and a list of group members 1107 (e.g., member names, pictures 1104, phone numbers, usernames, etc.). As shown, additional members may be added to a group by selecting an add member option 1106, and a user may remove himself from the group by selecting a remove user button 1108. It will be appreciated that, although four members are shown in the illustrated embodiment, a group chat may include virtually any number of members from at least two members to thousands of members.

In certain embodiments, the application may provide group administration functionality. For example, the application may provide a group administrator user the ability to remove other users from the group. The group administrator may also restrict other users from adding members to the group.

The group chat details 1100 screen may further display information pertaining to various messages sent to the group, including a list of decision messages 1110, a cork board 1112 containing a list of announcement messages, and/or a list of attachment messages 1114 sent to the group. Decision messages 1110 shown on this screen may include message text, links to any associated media content and/or options to view the results 1113 of the decision message or answer 1115 the decision message (depending on whether the user has already responded and/or the time to answer has expired). Announcement messages shown on the group chat details screen may include the content of the announcement. And attachment messages shown on this screen may display a preview of any attached media files (e.g., thumbnails of images, GIFs, videos, audio clips, etc.).

Figure 12:
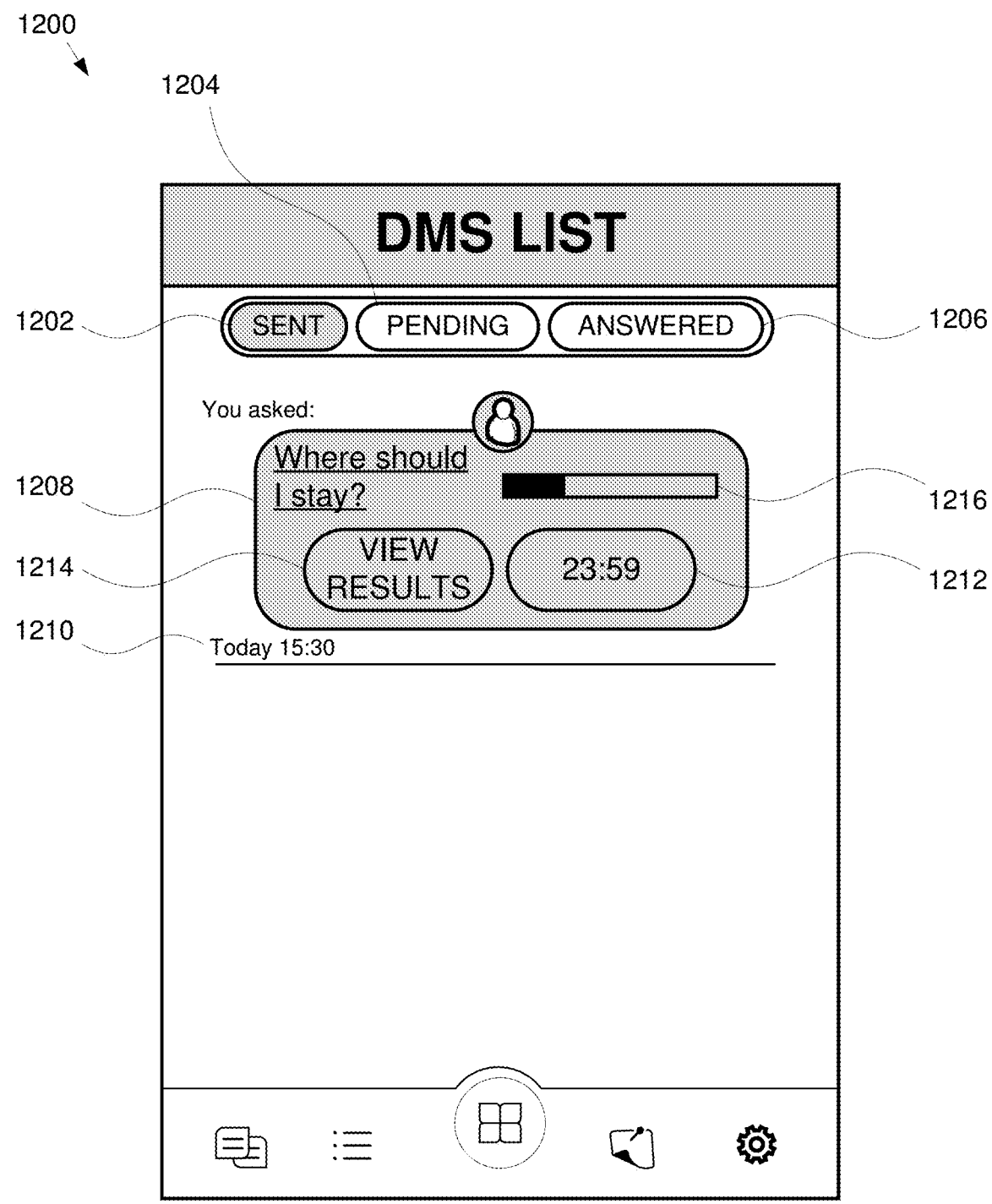
FIG. 12 illustrates an exemplary decision messages list screen of the group chat application.

Referring to FIG. 12, a decision messages list screen 1200 of an exemplary group chat application is shown. Generally, this screen allows a user to view a list of decision messages 1208 that are associated with the user's account. The list may display decision messages sent directly to the user or to one or more groups with which the user is associated. The list may also display decision messages sent by the user to others.

Each displayed decision message 1208 may also include additional information such as: sender information (e.g., sender name and/or the sender's profile image), a timestamp 1210 indicating when the message was sent, an elapsed time 1212, a hyperlink to view more details about the message, a link 1214 to view the results of the decision message (i.e., for completed decision messages), and/or a link to view additional media content provided in the decision message. The displayed messages may also show a progress bar 1216 providing a visualization of the time elapsed.

As shown, the list may be filterable by the status of decision messages. For example, the user may filter the list by sent decision message 1202 (i.e., messages sent by the user to others); pending decision messages 1204 (i.e., in-progress messages that have not been answered by the user); and answered decision messages 1206 (i.e., completed messages and/or in-progress messages to which the answer has provided a response).

Figure 13:
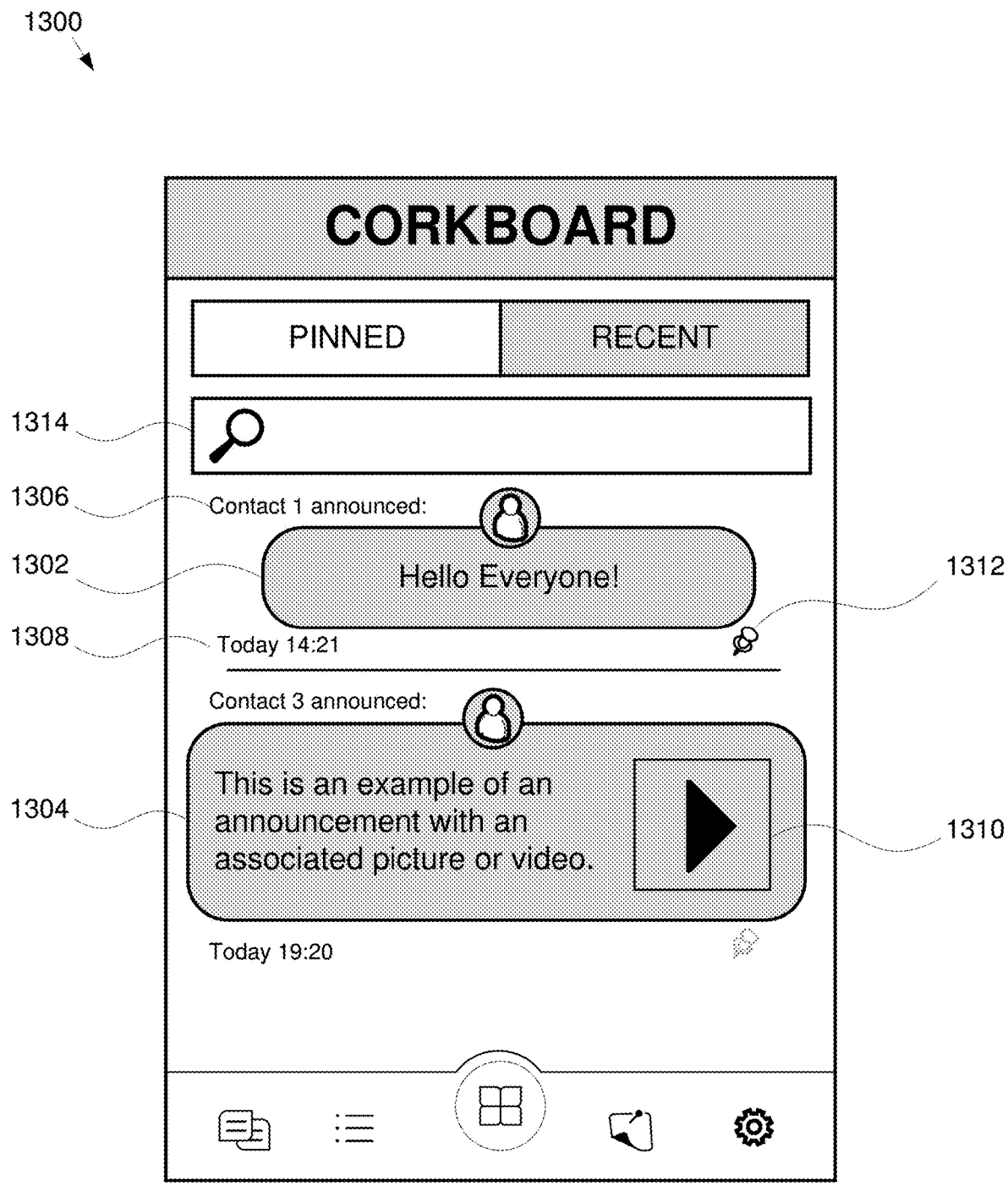
FIG. 13 illustrates an exemplary recent announcements list screen of the group chat application.

Referring to FIG. 13, a recent announcements list screen 1300 of an exemplary group chat application is illustrated. This screen shows a list of recent announcement messages (1302, 1304) associated with the user's account. The list may display recent announcements sent by the user and/or announcements sent by others directly to the user or to one or more groups with which the user is associated. Such recent announcements may be limited to announcements sent within a specified time period (e.g., in the last 5 days).

Each of the listed announcements (1302, 1304) may include a textual message and any additional information, such as sender information 1306 (e.g., sender name and/or the sender's profile image), a timestamp 1308 indicating when the decision message was sent/received, media content 1310 associated with the announcement (e.g., images, video, audio, emojis, gifs, etc.), and/or pinning information 1312 (e.g., whether or not the message is pinned to the group cork board). Media content 1310 provided with any announcement may be viewed or played by selecting the media content.

The listed announcements may be automatically sorted by date created, date modified, most recent activity, and/or alphabetically. Additionally, this screen may also provide search functionality allowing the user to perform a keyword search of all recent announcements through a search bar 1314.

Figure 14:
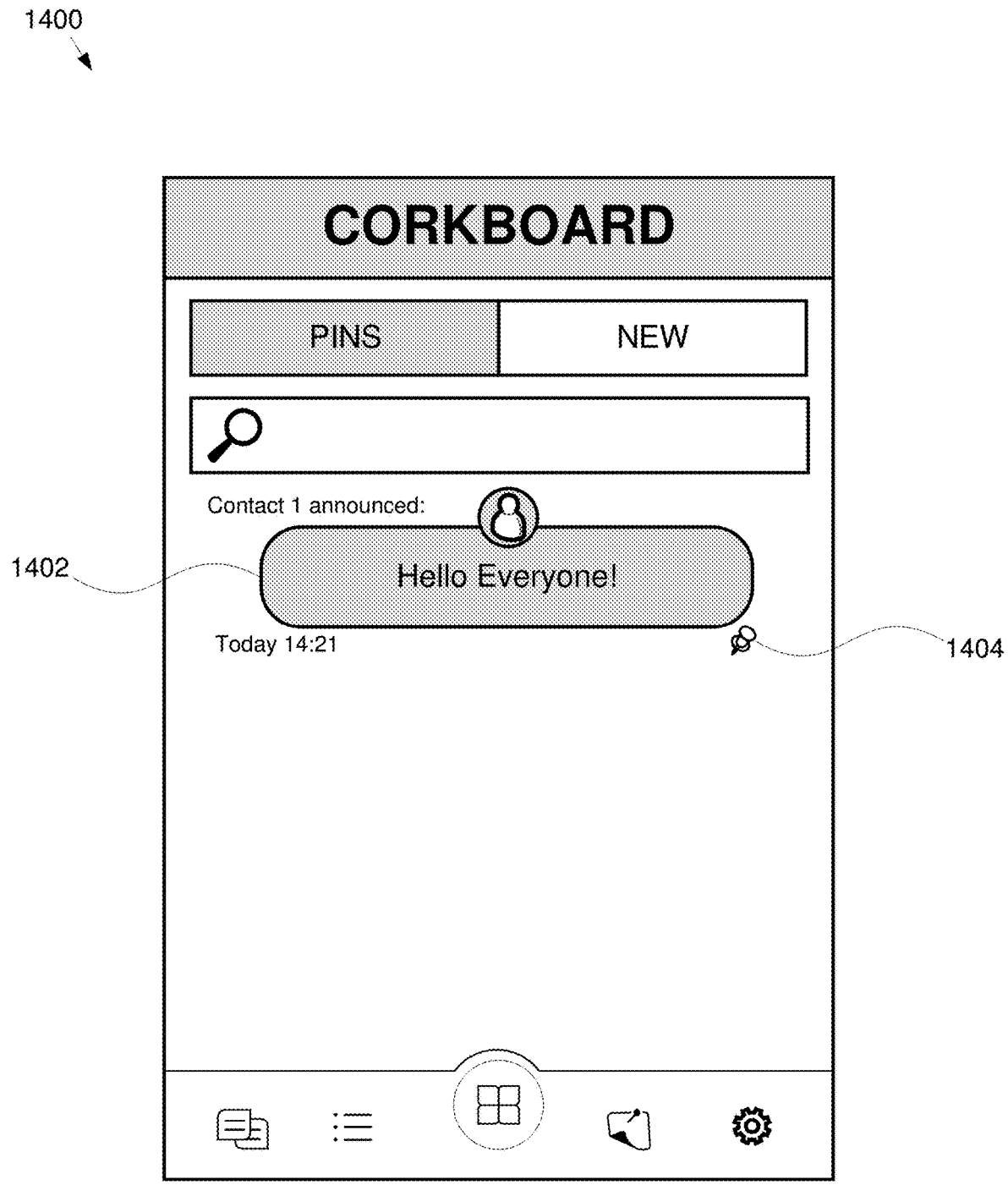
FIG. 14 illustrates an exemplary pinned announcements list screen of the group chat application.

Referring to FIG. 14, an exemplary pinned announcements list screen 1400 is shown. This screen is substantially similar to the recent announcements list screen 1300 of FIG. 13, except the listed announcements 1402 are limited to those that have been pinned by the user. An announcement may be "pinned" by selecting a pin icon 1404 next to the announcement 1402. The announcement may be removed from this screen by deselecting the pin icon 1404.

In certain embodiments, the instantly described group messaging systems and methods may comprise a predictive analysis engine that aggregates data from a server in order to provide recommendations to users based on information entered by or determined from users and/or any connected third-party data sources.

In one embodiment, the data collected may be processed in order to assist a user in adding an answer option to a decision message. When the user types a new decision message a guru button may appear, (see FIG. 8 at 822). Once the user enters a valid searchable text string, image, video, and/or hyperlink into the question entry box, the system may determine whether a suggestion is possible. If possible, the system may populate any number of suggested answer options for the user. If not possible, then they system may deliver other advice (e.g., a default message or a dynamic message based on predictive analysis of the user's entry).

As an example, a user may enter the following question, "Where should I stay?". In response, the system may populate one or more answer options for the user based on previous answers to similar questions or by conducting a search of connected third party databases (e.g., Yelp, Google, Bing, Kayak, Expedia, etc.). For example, the system may suggest the five highest rated hotels in the selected area. Alternatively or additionally, the guru may pull data from internal data stores collected from any number of groups across the service.

In another embodiment, the collected data may be processed to assist a group chat member in answering a decision message. When a member views an unanswered decision message, the user may select the guru button for assistance (see FIG. 9 at 922). The system may analyze the text of the decision message along with the provided answer options (e.g., via natural language processing) and provide available feedback to the answering user.

For example, the system may provide third-party reviews of listed hotels or restaurants or may provide statistics on the popularity of the choices across all users of the group messaging application. The provided information may be dynamic such that the member may sort and/or filter the information. This feature may incorporate an internal or external web search with customized content delivery.

In another embodiment, the collected data may be processed to supplement any decision message results. Once a decision message has been answered by all group members (and/or time has expired) the system may provide an interactive infographic with the results. The system may provide supplemental information for each of the various options decided on, or the highest ranked option (see FIG. 10).

For example, the system may display suggested retail outlets related to the results of a decision message about retail items. Such suggestions may include information relating to brick and mortar store locations, online store websites, item prices (including sales, discounts, coupons, etc.), and any relevant item reviews aggregated from connected third-party system.

In yet another embodiment, the collected data may be processed to provide users with actionable metrics and/or insights. The system may display pointed feedback on a user's usage statistics relating to their decision making, both individually and within each group. Such information may alternatively or additionally be displayed on one or more separate screens and may be customized for each group and/or for each user. As an example, a user may be able to view their interactions within each of their groups (e.g., how many of the user's first choices were also the group's first choice, how long the user takes to make a decision compared to the group average, how a user's choices rank percentage-wise with overall group choices as compared to group member's averages, etc.).

The system may collect information relating to the questions that are being asked in decision messages. Each question, across some or all group chats, may be parsed (e.g., via natural language processing) and stored in a relational database. Additional information may be collected for each question, including but not limited to, a location of the sender, a time of day the question was asked and a time frame begin/end date. Accordingly, the system may create heat maps or similar reports showing, for example, all the users asking questions about specific topics.

The system may alternatively or additionally collect information relating to the answer options associated with each question or question topic. For example, the system may collect the text of the answer options and/or how those options are ranked by system users. Accordingly, the system may report an associated poll to accompany the above-described heat maps (e.g., people in Anytown, USA are discussing ABC product, D number of times and the top options being picked are X, Y and Z (in order)).

The system may alternatively or additionally collect and report on information relating to user decisions. For example, the system may collect information such as: the amount of time it takes users to answer a particular question or questions on a particular topic; how many times users revisit questions based on particular topics; how many times users revisit questions they ask or others ask; how users interact with the answer options (e.g., how users move options around and/or how many times users interact with the options); and/or how users interact with the available ways to answer questions.

Figure 15:
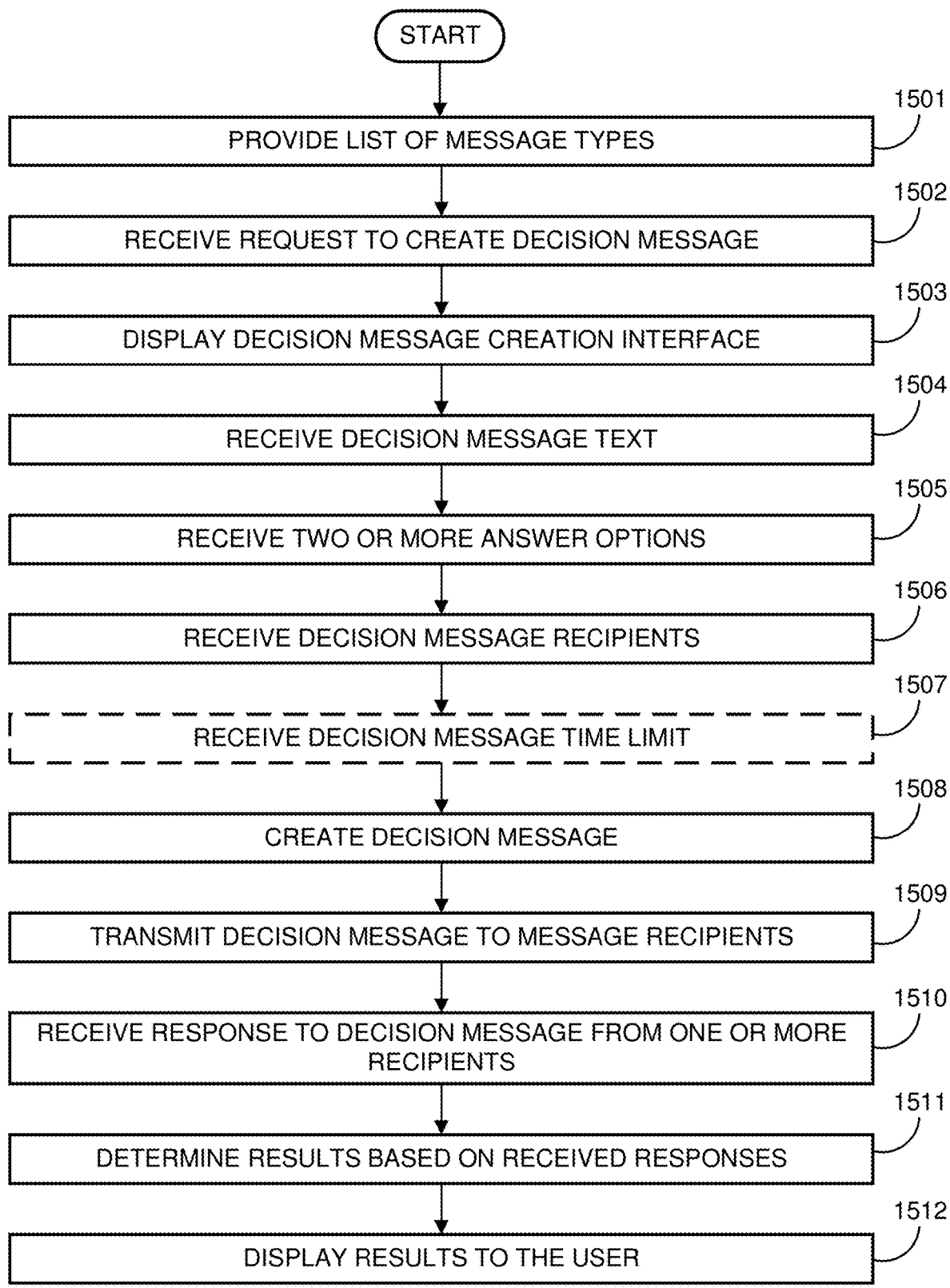
FIG. 15 is a method diagram illustrating an exemplary decision message creation and response process.

Referring to FIG. 15, an exemplary decision message creation and response process is illustrated. At a first step 1501, the system may provide a list of multiple message types for a user to select from. As described above, the message types may include text messages, decision messages, announcement messages, and attachment messages, any of which may be created and sent to any number of recipients in any number of groups.

At step 1502, the system receives a request to create a decision message from a user. And at step 1503, the system displays a decision message creation interface (see, e.g., FIG. 8) allowing the user to provide the content of a decision message.

At step 1504, the system receives decision message text content. Such text may be in any format, but may typically be in the form of a question. For example, the text may comprise an open-ended question (i.e., requiring recipient input) or a binary question (i.e., to which the answer is either yes or no).

At step 1505, the system may receive two or more answer options for the decision message. Such answer options may include text content, any number of media files and/or hyperlinks to web pages or other digital content that may be used by recipients of the decision message to choose answer options.

At optional step 1506, a time limit or deadline may be received for the decision message. As discussed above, responses may only be submitted to a decision message before any assigned time limit expires.

At step 1507, any number of recipients may be received for the decision message. As discussed above, recipients may comprise contacts associated with one or more groups. As an example, a user may select a group from a list of chat groups to which they are associated to designate each of the group's members as recipients. As another example, a user may select one or more contacts (e.g., from a list of contacts) to whom they would like to send the decision message. The user may create a new group that includes all of the selected contacts or may choose to create multiple "groups," where each group includes only the user and one of the selected contacts.

At step 1508, the system creates a decision message comprising the received message text, the two or more answer options and, optionally, the time limit. The decision message may be stored in local memory of a user device and/or remote memory of a server.

At step 1509, the system transmits the decision message to the one or more message recipients. The message may be displayed to each of the recipients such that they may view it and provide a response.

At step 1510, the system receives response(s) to the decision message from one, some or all of the recipients. As discussed above, each response may comprise a selection of one of the provided answer options or may comprise a list of the answer options ranked by the respondent's preference.

It will be appreciated that, if a time limit is associated with the decision message, the system may only allow responses to be submitted before the time limit expires. In this case, the system may first determine that the time limit has not expired before any response is received. In any event, received responses may be stored by the system and associated with the decision message.

At step 1511, the system determines the results of the decision message based on the received responses. Results may be calculated upon receiving responses from all of the message recipients or, if the message includes a time limit, upon expiration of the time limit.

Finally, at step 1512, the system displays the results to the user. As described above, the results may be displayed in a number of formats and may comprise answer option rankings, vote count, percentage of total vote, and visualizations. Such results may be stored by the system and associated with the decision message. In certain embodiments, the results may additionally be displayed to some or all of the respondents and/or recipients of the decision message.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus. And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM"). The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a Global Positioning System ("GPS") receiver, or a portable storage device (e.g., a universal serial bus ("USB") flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a back-end component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

As discussed in detail above, the computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A computer-implemented method of determining group preferences via interactive messages, the method comprising:
    receiving, by a computer, a request to create an interactive message from a user;
    receiving, by the computer, interactive message text from the user;
    receiving, by the computer, a plurality of interactive message answer options from the user;
    receiving, by the computer, a plurality of interactive message recipients from the user;
    creating, by the computer, an interactive message comprising the message text and the answer options;
    receiving, by the computer, a response time limit from the user;
    associating, by the computer, the response time limit with the created interactive message;
    associating, by the computer, a go-with-the-flow ("GWTF") option with the created interactive message;
    transmitting, by the computer, the interactive message to each of the recipients via an interactive message response interface that displays a list of the answer options, each answer option associated with a position in the list indicating a ranking,
        wherein the interactive message response interface is adapted to allow recipients to either select the GWTF option or modify the position of each of the answer options in the list in order to specify the ranking of the answer options;
    determining, by the computer, an amount of time remaining to respond to the interactive message, based on a transmission time of the interactive message, a current time, and the response time limit;
    displaying, by the computer, to the recipients via the interactive message response interface, a countdown timer showing the amount of time remaining to respond to the interactive message;
    receiving, by the computer, a response to the interactive message from at least one of the recipients, each response comprising the respective recipient's ranking of the answer options or a selection of the GWTF option,
        wherein each response is received only before the time limit;
    determining a result of the interactive message comprising:
        calculating a total score for each of the answer options, based on the rankings of the answer options in the responses;
        determining an overall ranking of each answer option, based on the total score of each answer option;
        determining a winning answer option based on the overall ranking of each answer option; and
        calculating, for the winning answer option, a final score based on the calculated total score for the answer option and each of the GWTF option selections in the responses; and
    transmitting the results to the user.

2. A computer-implemented method according to claim 1, further comprising:
    displaying, by the computer, an interactive message creation interface to the user; and
    receiving, by the computer, the interactive message text, the answer options and the recipients from the user, via the interactive message creation interface.

3. A computer-implemented method according to claim 1, wherein the results of the interactive message are determined upon expiration of the response time limit or upon receiving responses from all of the recipients, whichever occurs first.

4. A computer-implemented method according to claim 1, wherein the interactive message response interface is further adapted to automatically assign each of the answer options to a list position, upon receiving a request for automatic ranking from a recipient.

5. A computer-implemented method according to claim 1, wherein each of the answer options comprises text content and one or more media files.

6. A computer-implemented method according to claim 1, further comprising displaying the results to one or more of the recipients of the interactive message.

7. A computer-implemented method according to claim 1, wherein each of the recipients of the interactive message is associated with a group, and wherein the method further comprises:
displaying the results of the interactive message to the recipients via a group messaging feed.

8. A computer-implemented method according to claim 1, further comprising displaying a plurality of message types that may be created by the computer, the message types comprising: a text message, an interactive message, an announcement message and an attachment message.

9. A group messaging system for facilitating group decision-making via interactive messages, the system comprising:
a user device associated with a user;
a plurality of recipient devices, each recipient device associated with a recipient; and
a server in communication with the user device and each of the recipient devices via a network, the server adapted to:
receive a request to create an interactive message from the user device;
receive interactive message text from the user device;
receive a plurality of interactive message answer options from the user device;
receive a plurality of interactive message recipients from the user device;
create an interactive message comprising the message text and the answer options;
receive a response time limit from the user device;
associate the response time limit with the created interactive message;
associate a go-with-the-flow ("GWTF") option with the created interactive message;
transmit the interactive message to each of the recipient devices via an interactive message response interface that displays a list of the answer options, each answer option associated with a position in the list indicating a ranking,
wherein the interactive message response interface is adapted to allow recipients to either select the GWTF option or modify the position of each of the answer options in the list in order to specify the ranking of the answer options;
determine an amount of time remaining to respond to the interactive message, based on a transmission time of the interactive message, a current time, and the response time limit;
display, to each of the recipient devices via the interactive message response interface, a countdown timer showing the amount of time remaining to respond to the interactive message;
receive a response to the interactive message from at least one of the recipient devices, each response comprising the respective recipient's ranking of the answer options or a selection of the GWTF option,
wherein each response is received only before the time limit;
determine a result of the interactive message comprising:
calculating a total score for each of the answer options, based on the rankings of the answer options in the responses;
determining an overall ranking of each answer option, based on the total score of each answer option;
determining a winning answer option based on the overall ranking of each answer option; and
calculating, for the winning answer option, a final score based on the calculated total score for the answer option and each of the GWTF option selections in the responses; and
transmit the results to the user device.

10. A system according to claim 9, wherein the user device is adapted to:
display an interactive message creation interface to the user;
receive the interactive message text, the answer options, and the recipients from the user via the interactive message creation interface; and
transmit the interactive message text, the answer options and the recipients to the server.

11. A system according to claim 9, wherein the server determines the results of the interactive message upon expiration of the response time limit or upon receiving responses from all of the recipient devices, whichever occurs first.

12. A system according to claim 9, wherein the server is further adapted to:
receive a request for automatic ranking from a first recipient device of the plurality of recipient devices;
automatically determine a list position for each of the answer options; and
transmit the list positions to the first recipient device.

13. A system according to claim 9, wherein each of the answer options comprises text content and one or more media files.

14. A system according to claim 9, wherein the server is further adapted to transmit the results to one or more of the recipient devices.

15. A system according to claim 14, wherein:
each of the recipients is associated with a group; and
each of the recipient devices is adapted to:
display the results of the interactive message to the associated recipient via a group messaging feed.

16. A system according to claim 9, wherein the server is further adapted to create and transmit a plurality of message types to the recipient devices, the message types comprising: text messages; interactive messages; announcement messages and attachment messages.

* * * * *